United States Patent [19]

Mosier et al.

[11] Patent Number: 4,531,189

[45] Date of Patent: Jul. 23, 1985

[54] DATA CONVERSION, COMMUNICATION AND ANALYSIS SYSTEM

[75] Inventors: John E. Mosier; Jim B. Surjaatmadja; George B. McLawhon; Jack C. Penn, all of Duncan, Okla.

[73] Assignee: Halliburton Company, Duncan, Okla.

[21] Appl. No.: 355,317

[22] Filed: Mar. 8, 1982

[51] Int. Cl.³ .............................................. G06F 15/20
[52] U.S. Cl. ....................................... 364/550; 358/282; 364/422; 364/551; 382/56
[58] Field of Search ............... 364/422, 550, 551; 179/2 DP, 2 DR, 2 VT; 358/282, 284, 257; 382/51, 54, 56

[56] References Cited

U.S. PATENT DOCUMENTS

| | | | |
|---|---|---|---|
| 3,256,480 | 6/1966 | Runge et al. | 364/422 X |
| 3,435,132 | 3/1969 | Richards | 375/122 |
| 3,457,544 | 7/1969 | Miller et al. | 340/858 |
| 3,553,362 | 1/1971 | Mounts | 375/122 |
| 3,609,244 | 9/1971 | Mounts | 375/122 |
| 3,872,248 | 3/1975 | Winters | 358/289 |
| 3,876,825 | 4/1975 | Murakami et al. | 358/261 |
| 3,882,305 | 5/1975 | Johnstone | 364/551 |
| 3,955,045 | 5/1976 | Ford, Jr. | 358/288 |
| 4,001,500 | 1/1977 | Lavery et al. | 358/282 |
| 4,020,462 | 4/1977 | Morrin, II | 382/56 |
| 4,055,763 | 10/1977 | Antkiw | 364/422 X |
| 4,157,659 | 6/1979 | Murdock | 364/422 X |
| 4,258,421 | 3/1981 | Juhasz et al. | 364/424 |
| 4,297,727 | 10/1981 | Ogawa et al. | 358/261 |
| 4,310,887 | 1/1982 | Suau | 364/422 |
| 4,312,040 | 1/1982 | Tinch et al. | 364/422 |
| 4,327,379 | 4/1982 | Kadakia et al. | 358/261 |
| 4,335,277 | 6/1982 | Puri | 364/900 X |
| 4,390,953 | 6/1983 | Johnstone | 364/167 X |

Primary Examiner—Edward J. Wise
Assistant Examiner—Edward R. Cosimano
Attorney, Agent, or Firm—E. Harrison Gilbert, III; Joseph A. Walkowski; Thomas R. Weaver

[57] ABSTRACT

A local station and a central computer subsystem remotely located from each other are interconnected by a transmission system, such as a telephone network, so that a medium containing visual data can be read in the vicinity where the cart is made, but automatically analyzed by a computer at the central computer subsystem. The local station includes an optical reader device for reading the medium and converting the visual data contained thereon into numerical data in the form of binary electrical signals. The binary electrical signals are compressed by a hardware compressor circuit and a software compressor program so that the transmission time for transmitting the data to the central computer subsystem is reduced. Once the data is transmitted to the central computer subsystem, an analysis of the data is made after any desired modifications of the data have been made through a graphics terminal.

8 Claims, 19 Drawing Figures

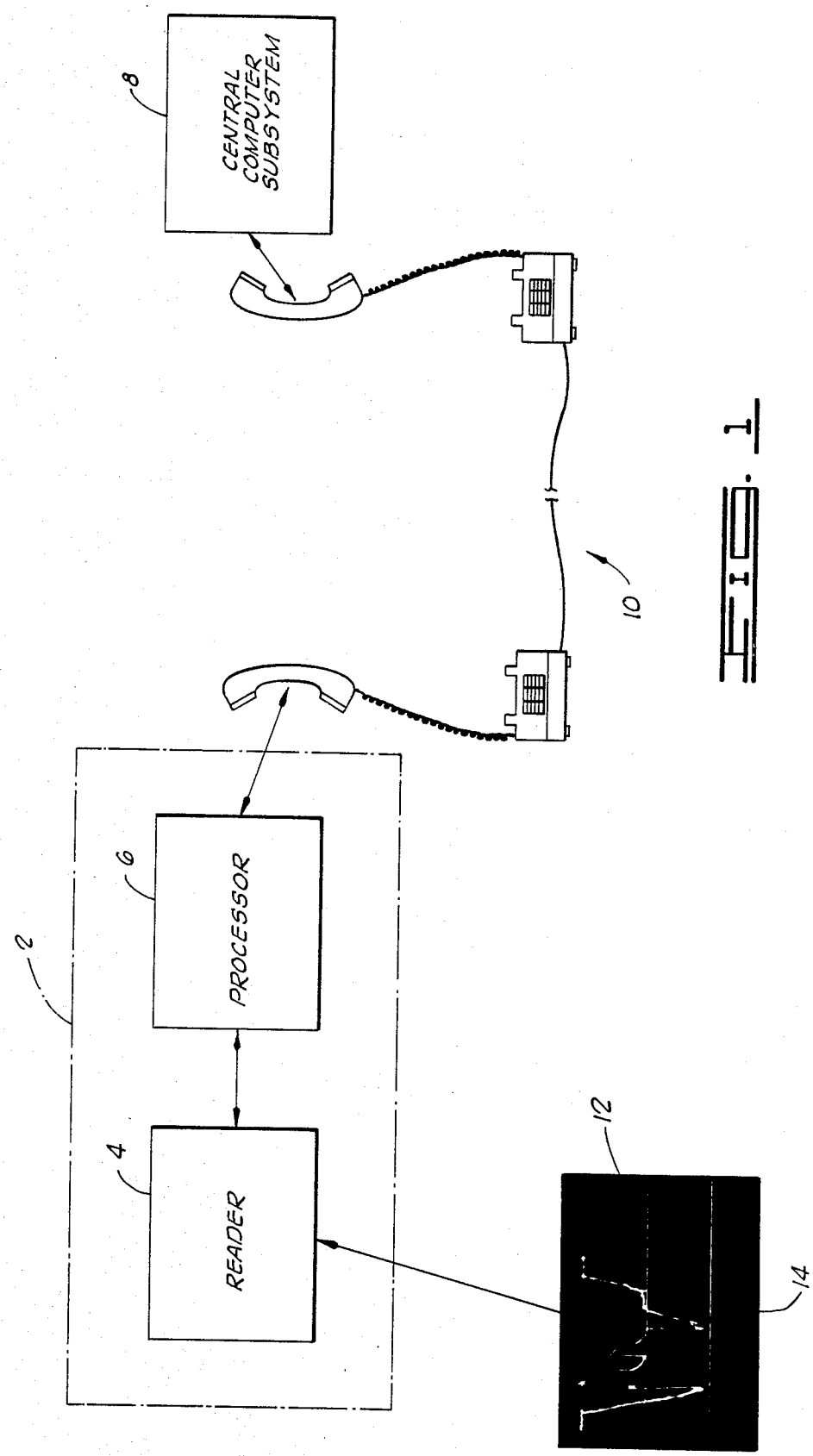

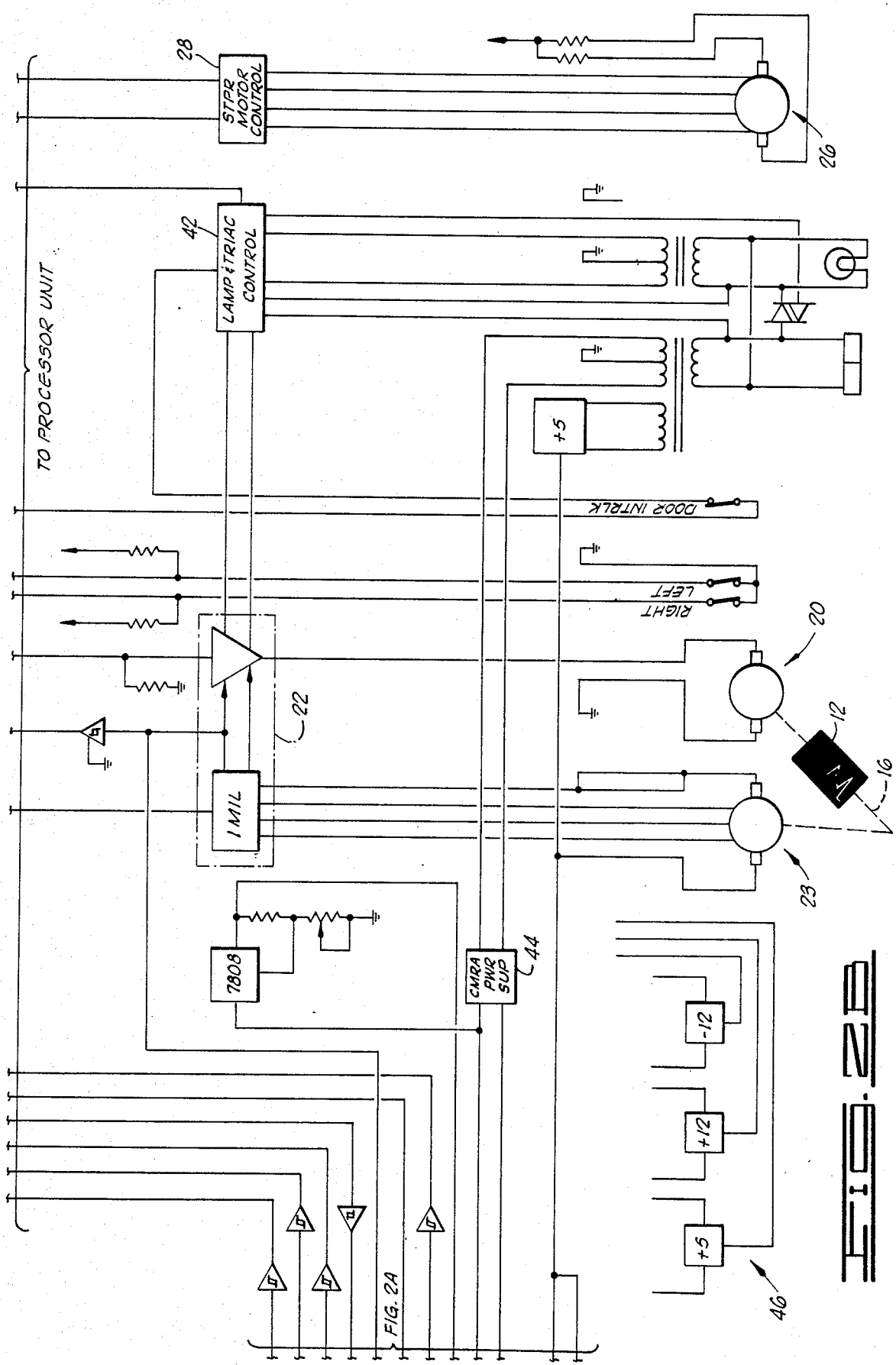

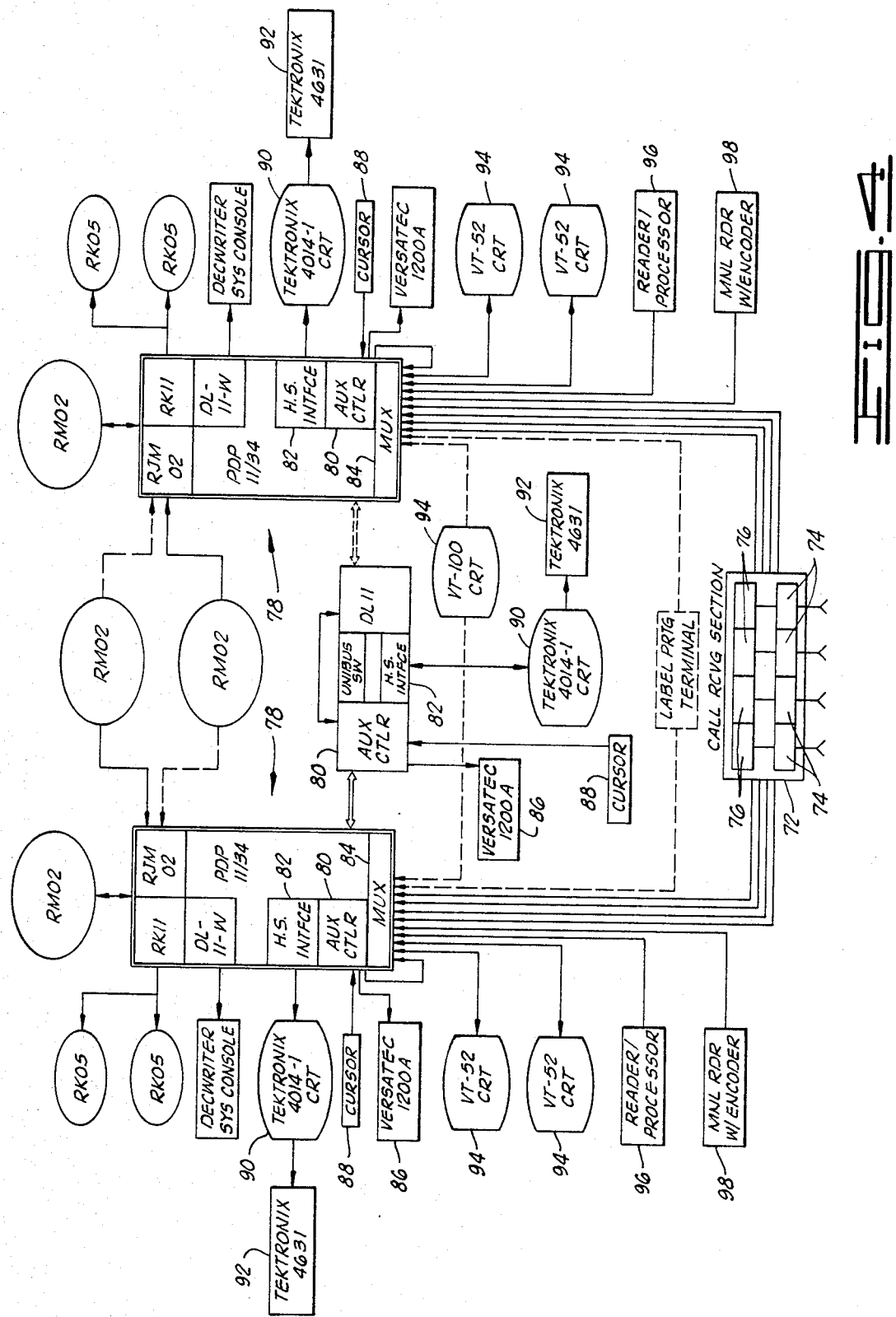

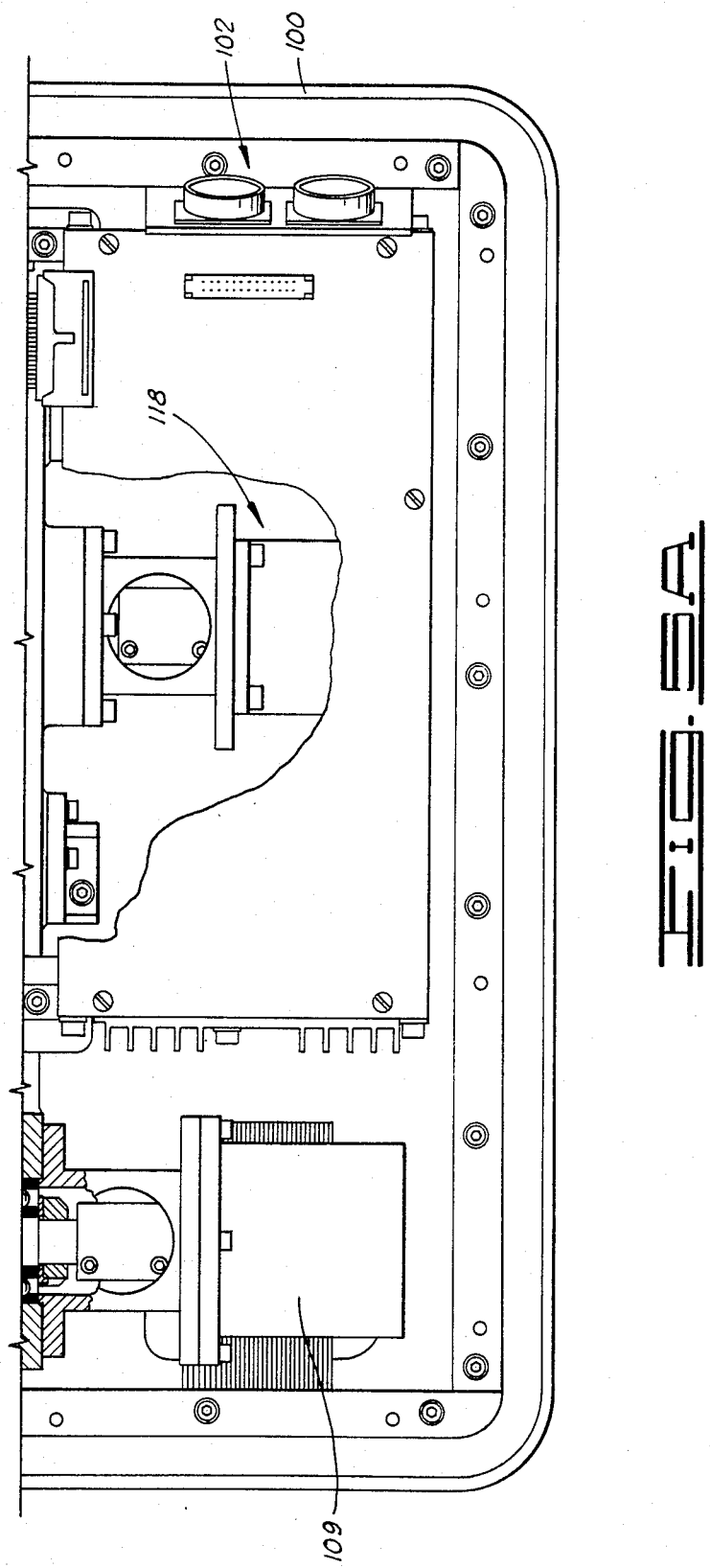

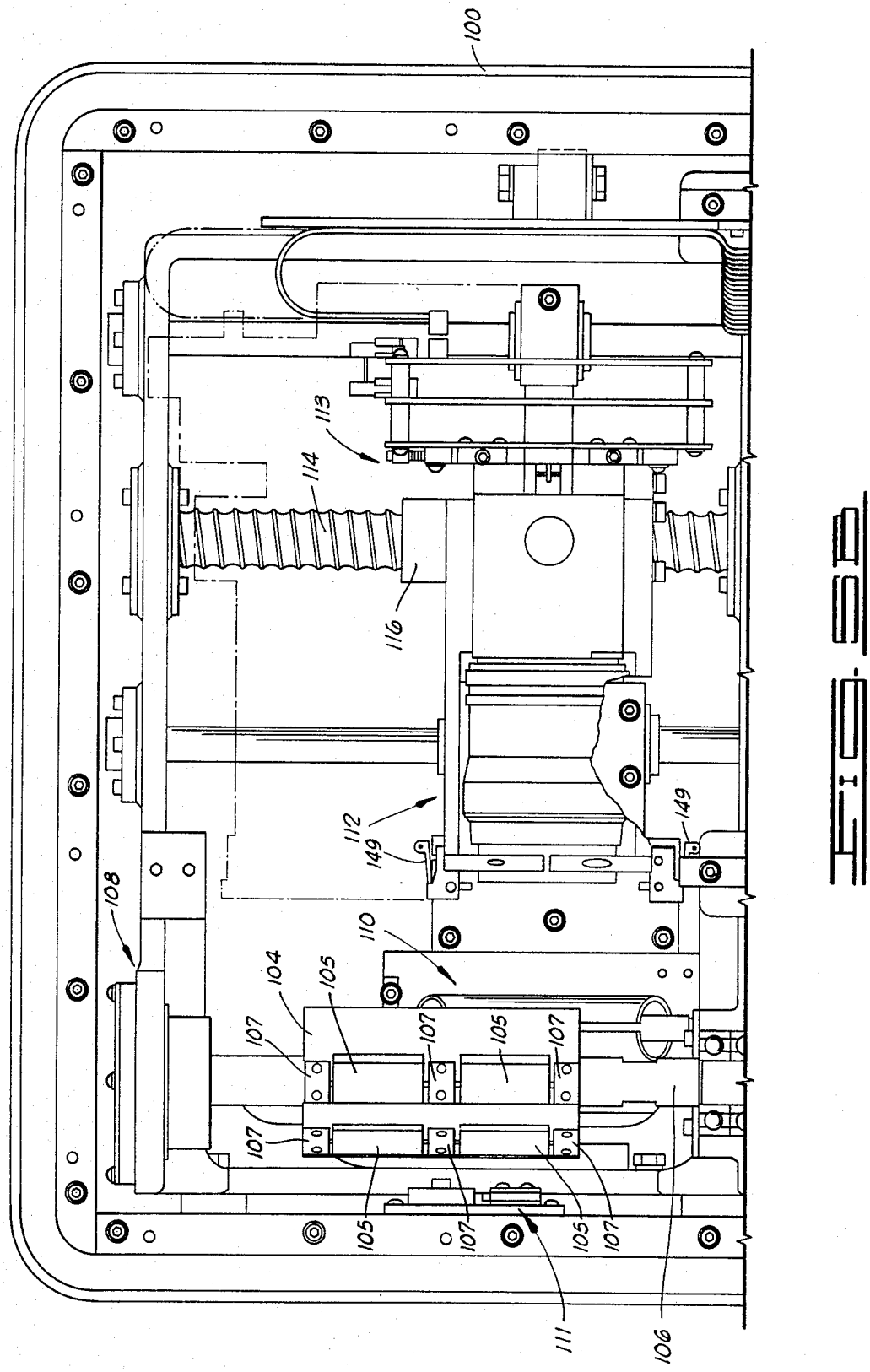

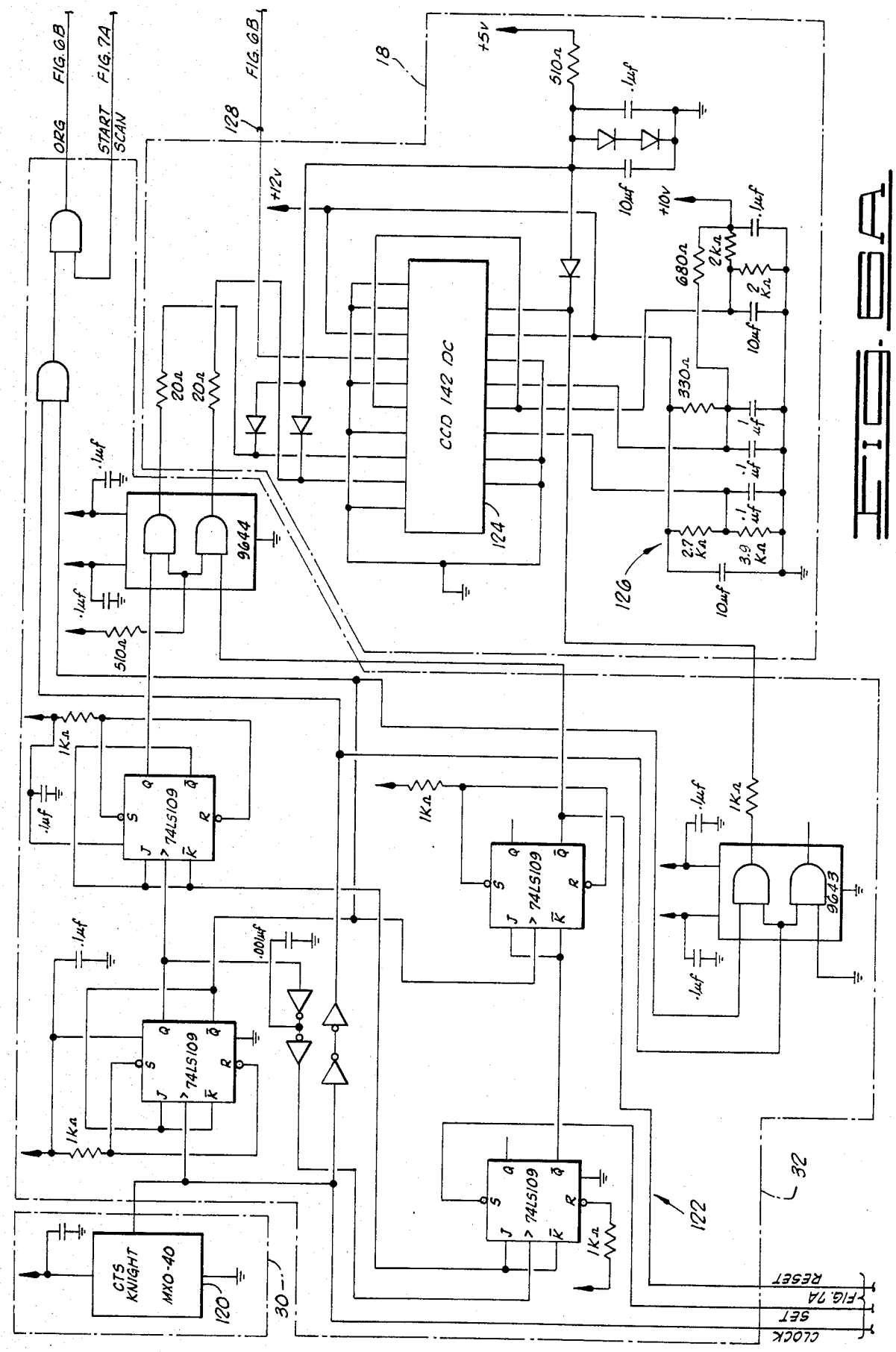

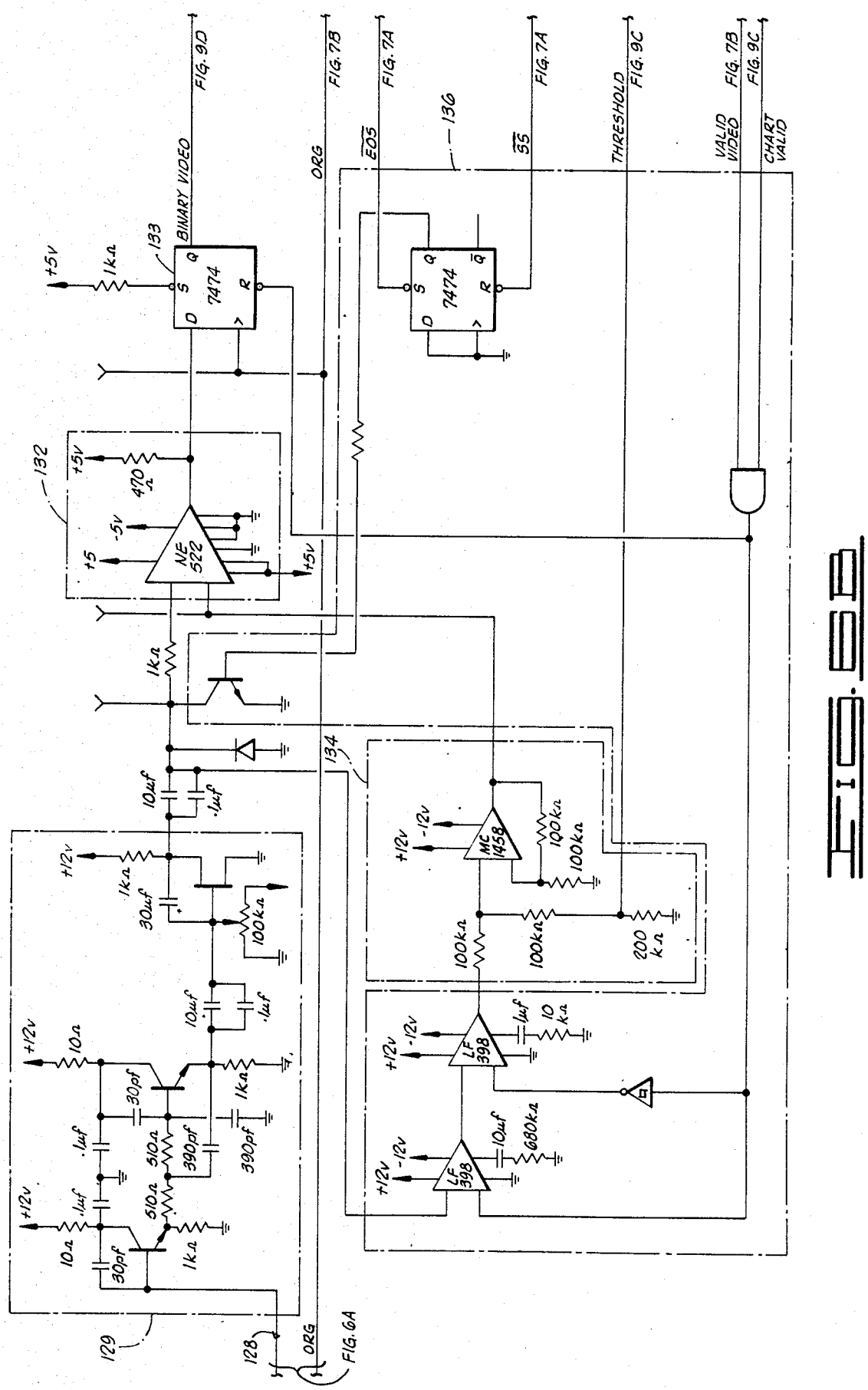

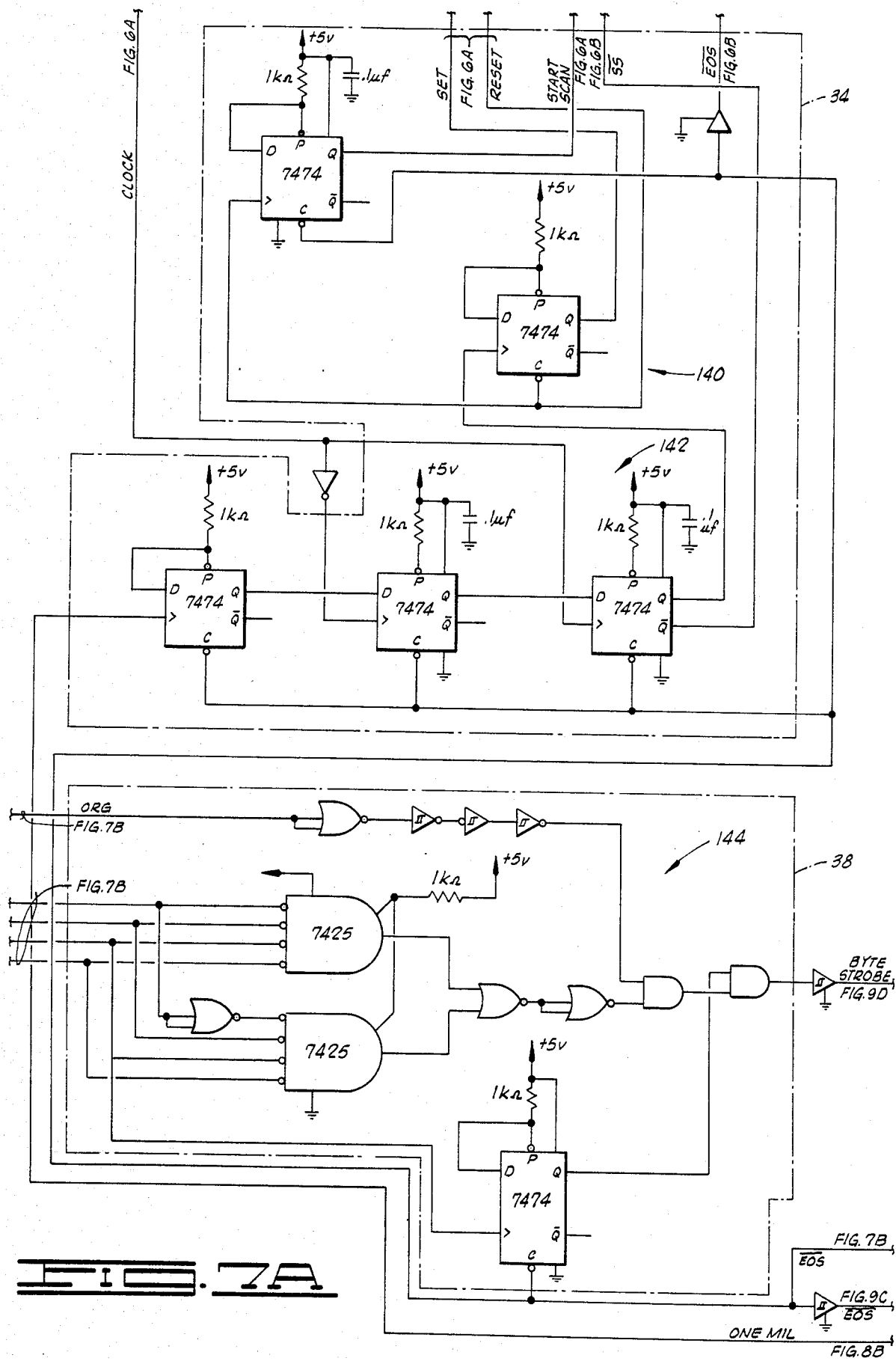

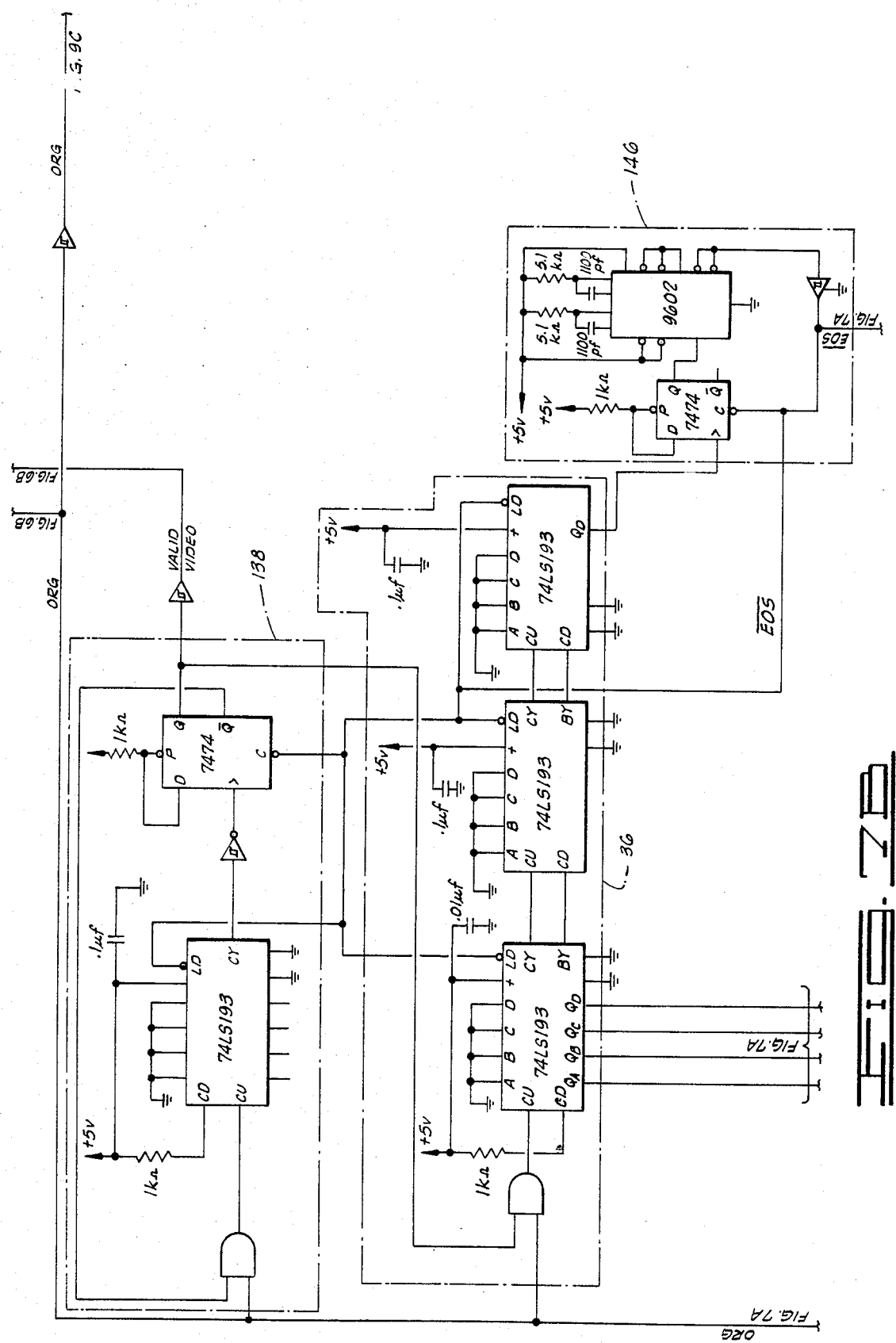

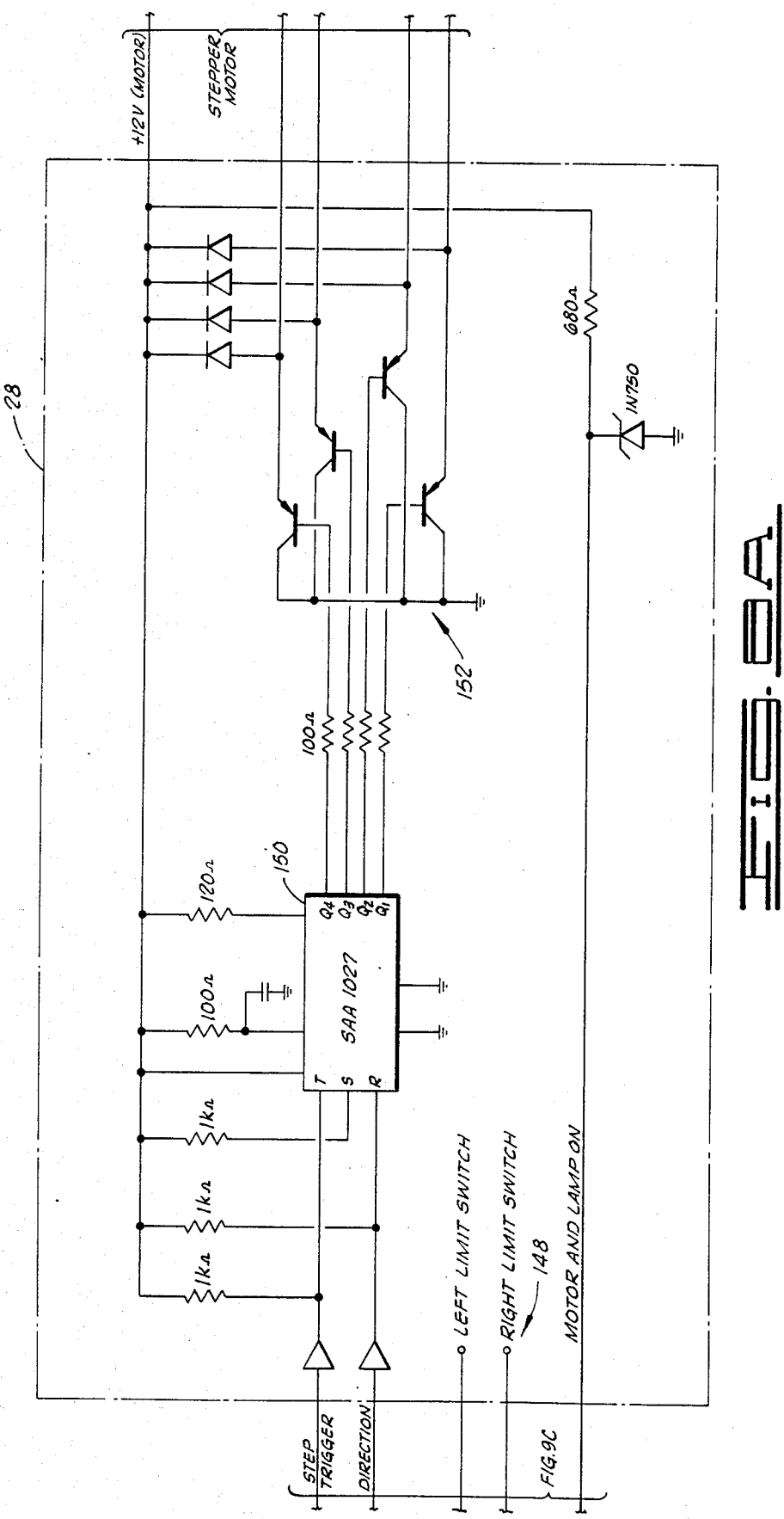

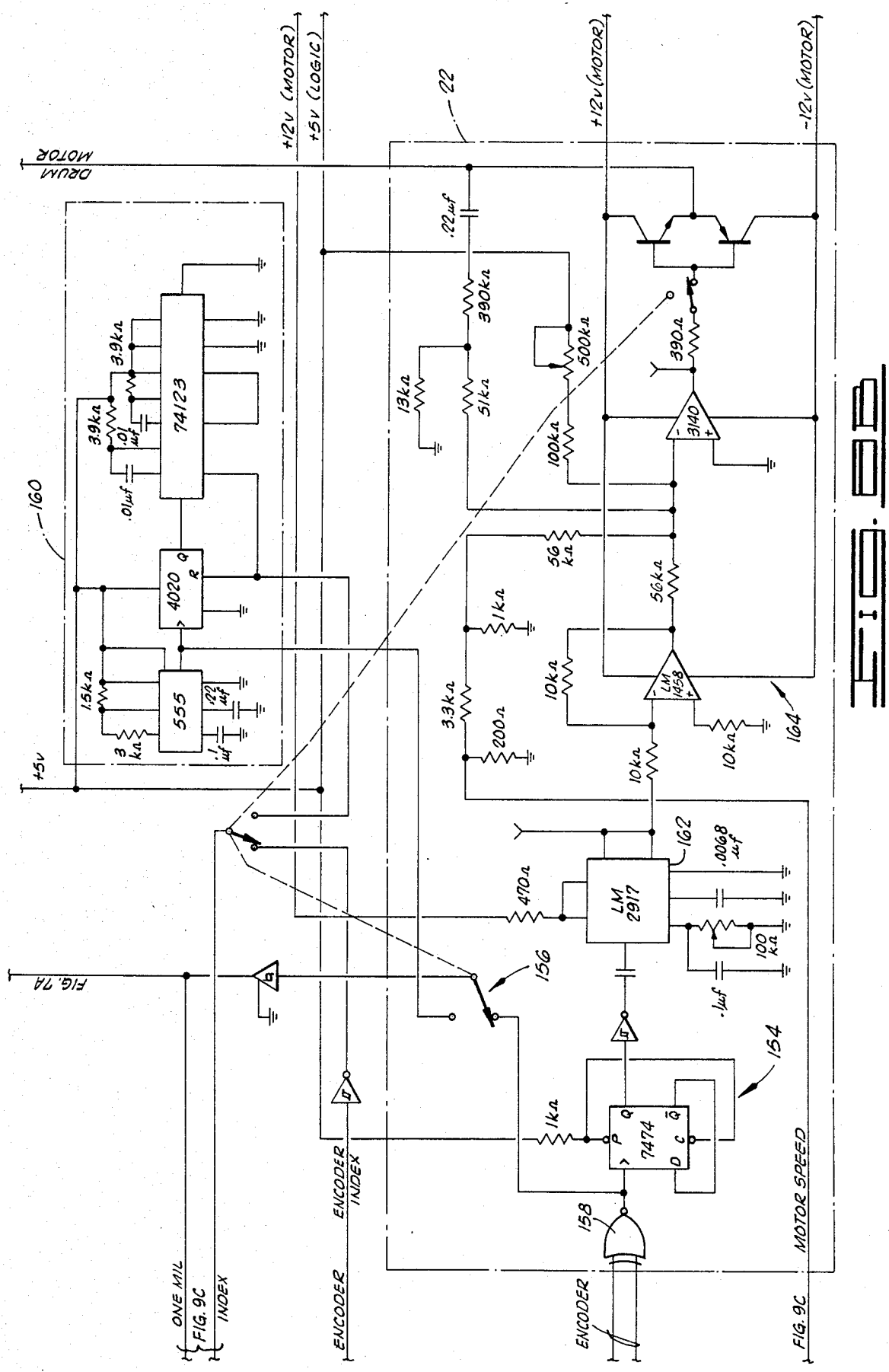

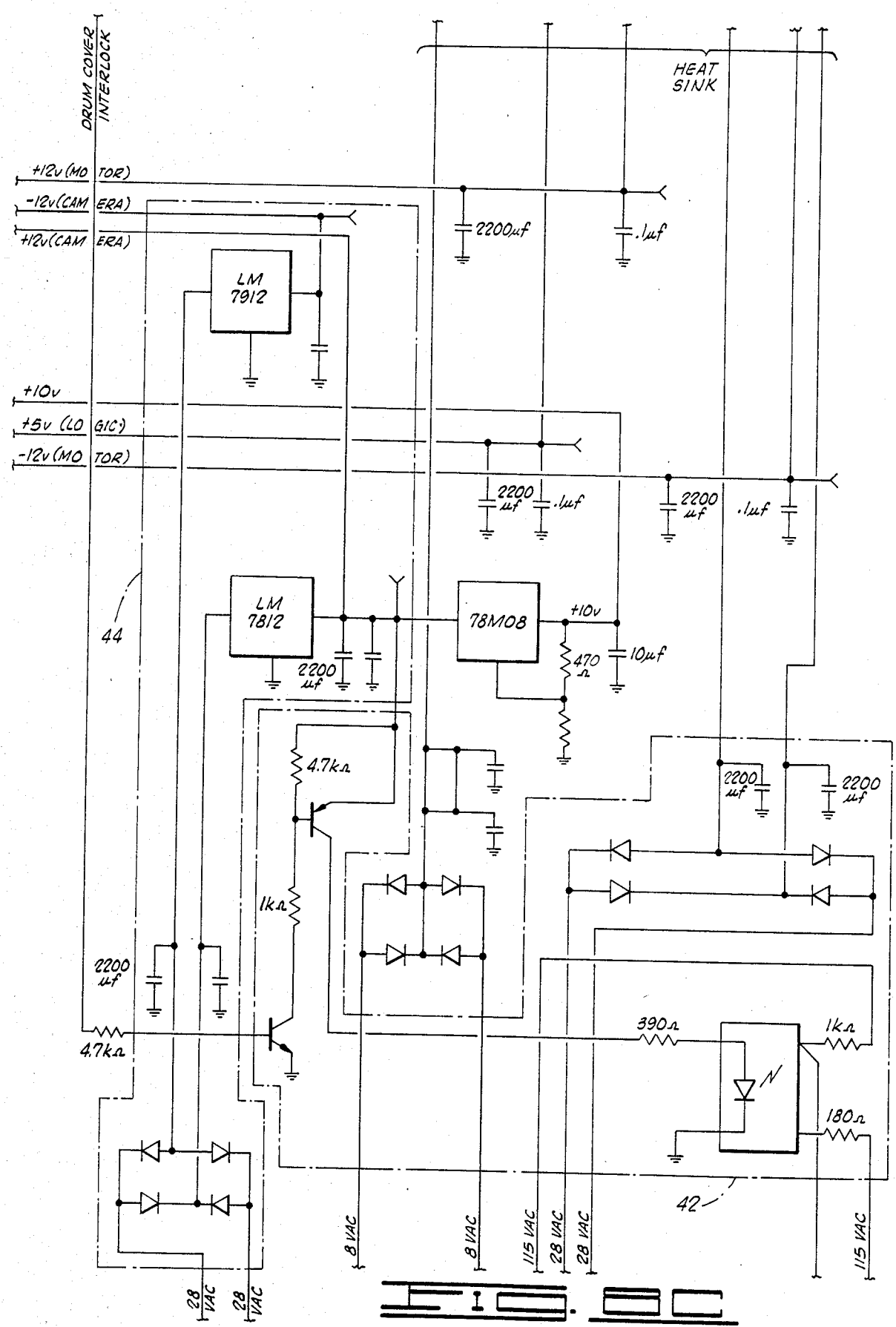

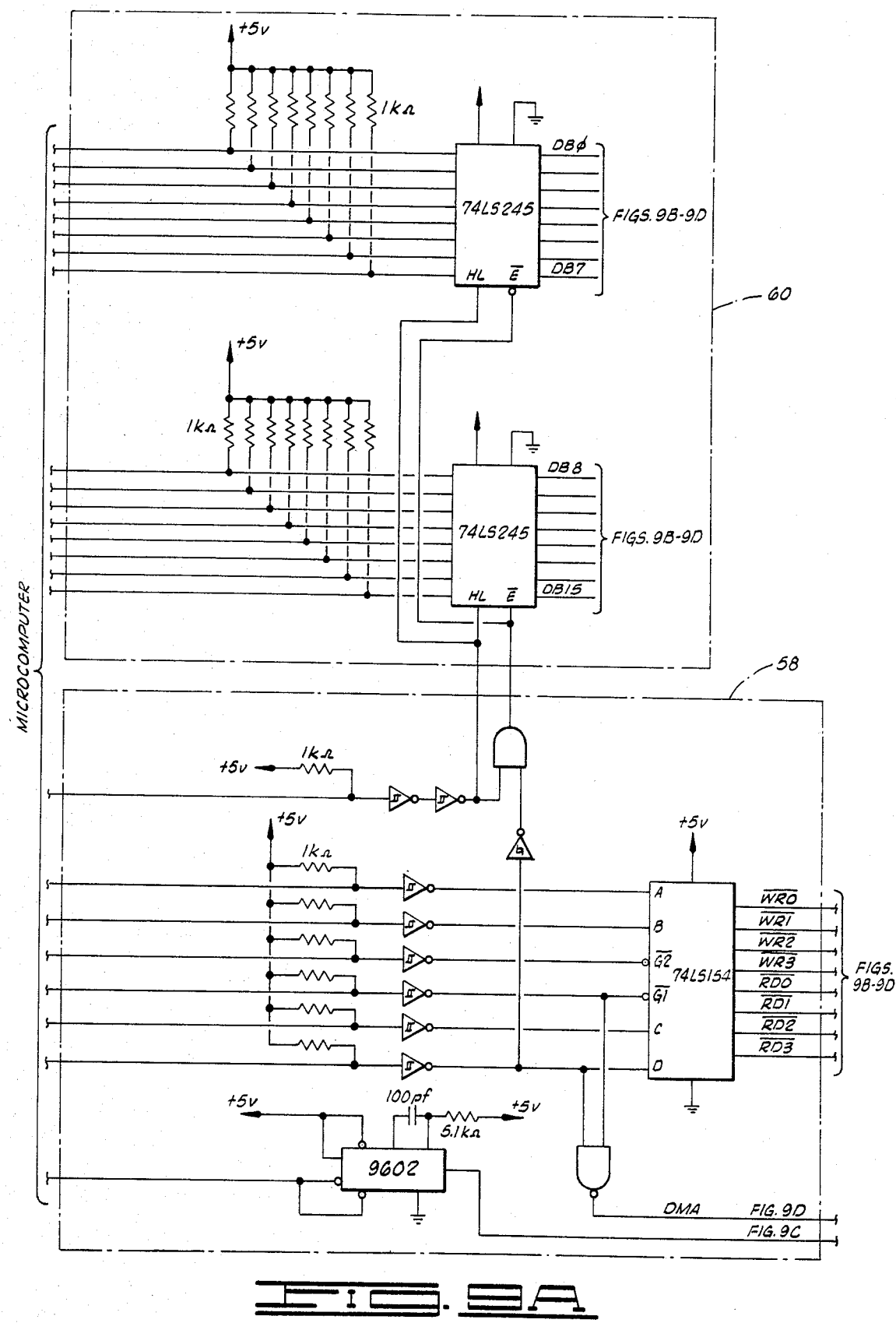

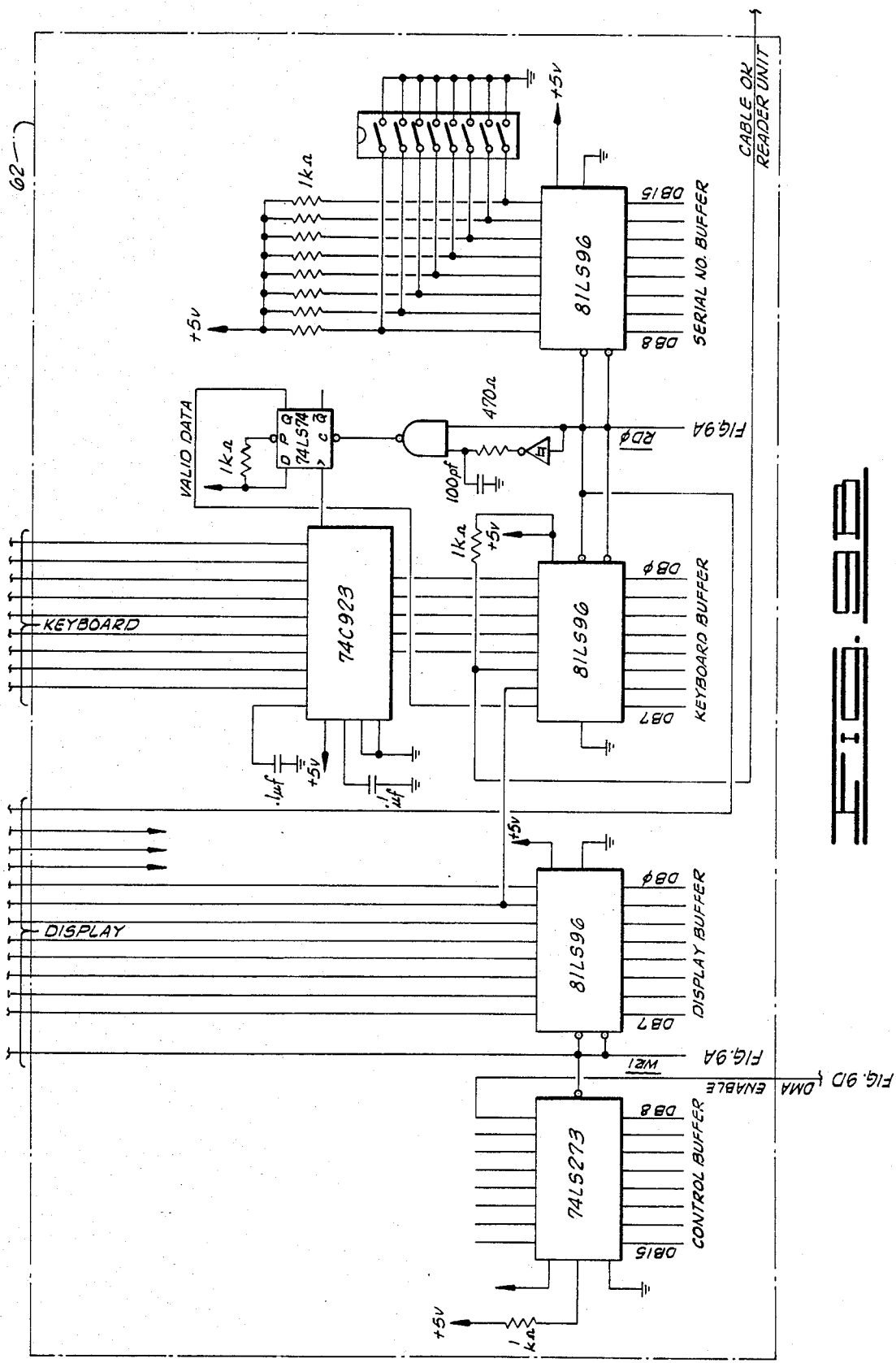

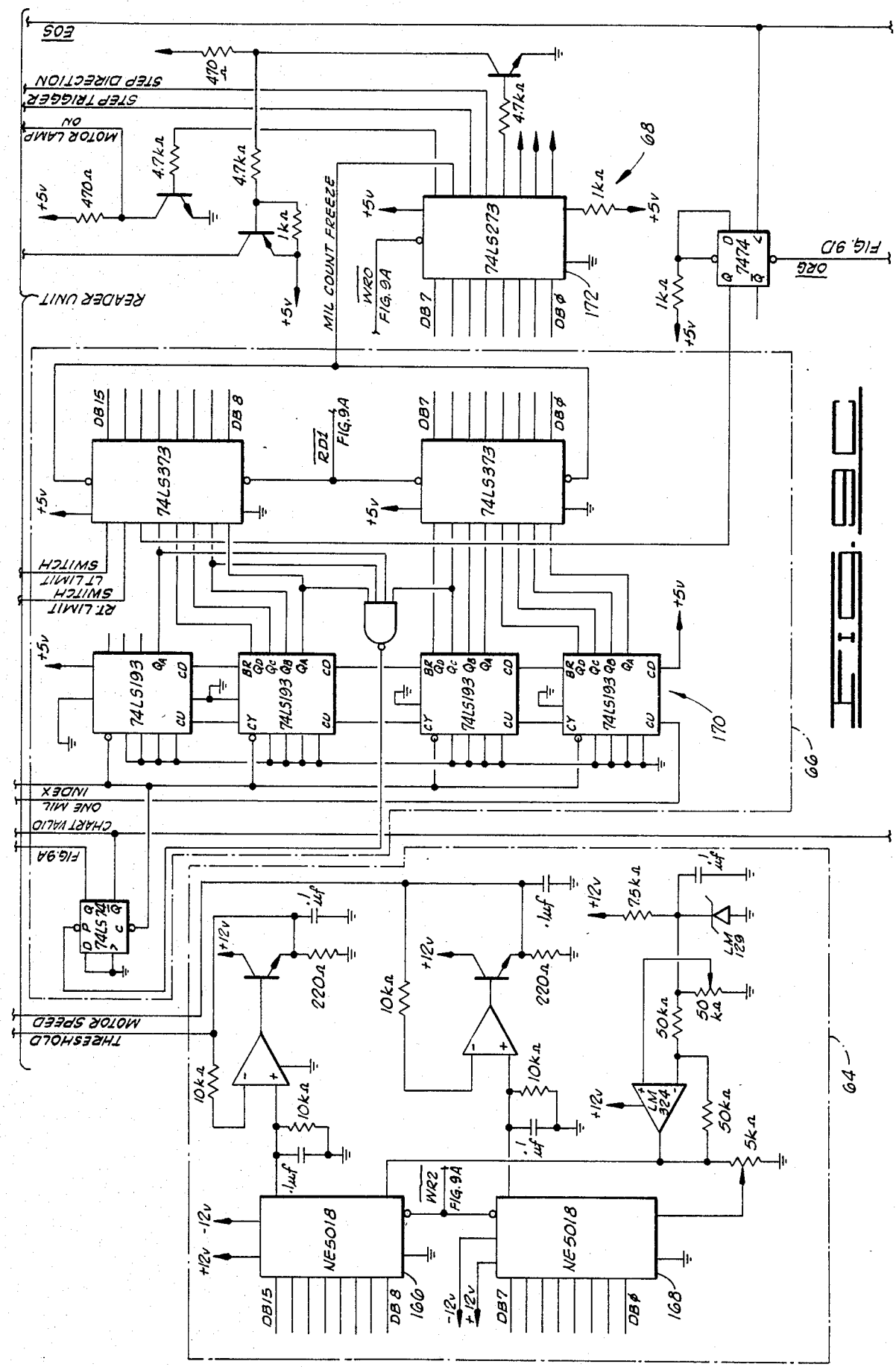

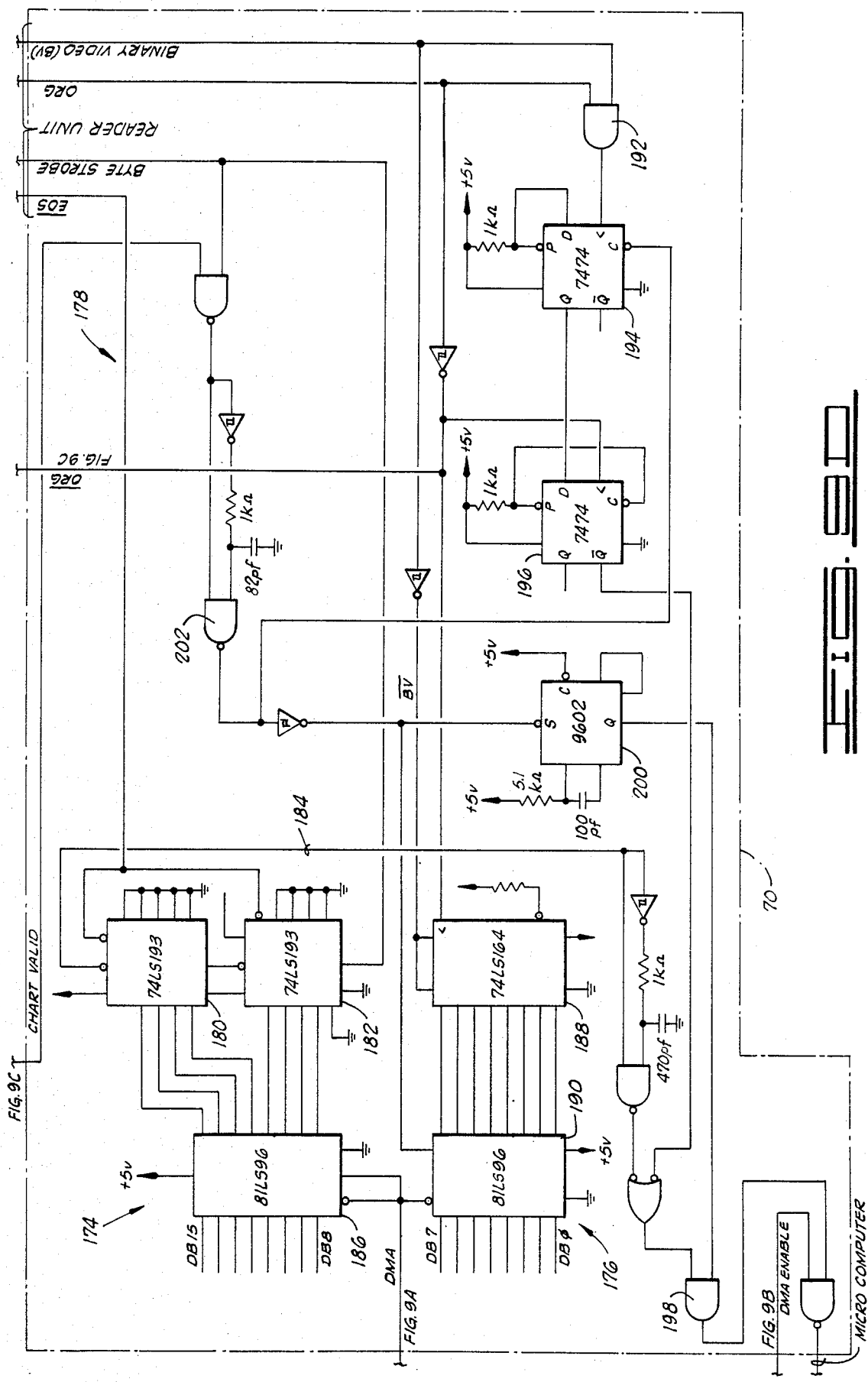

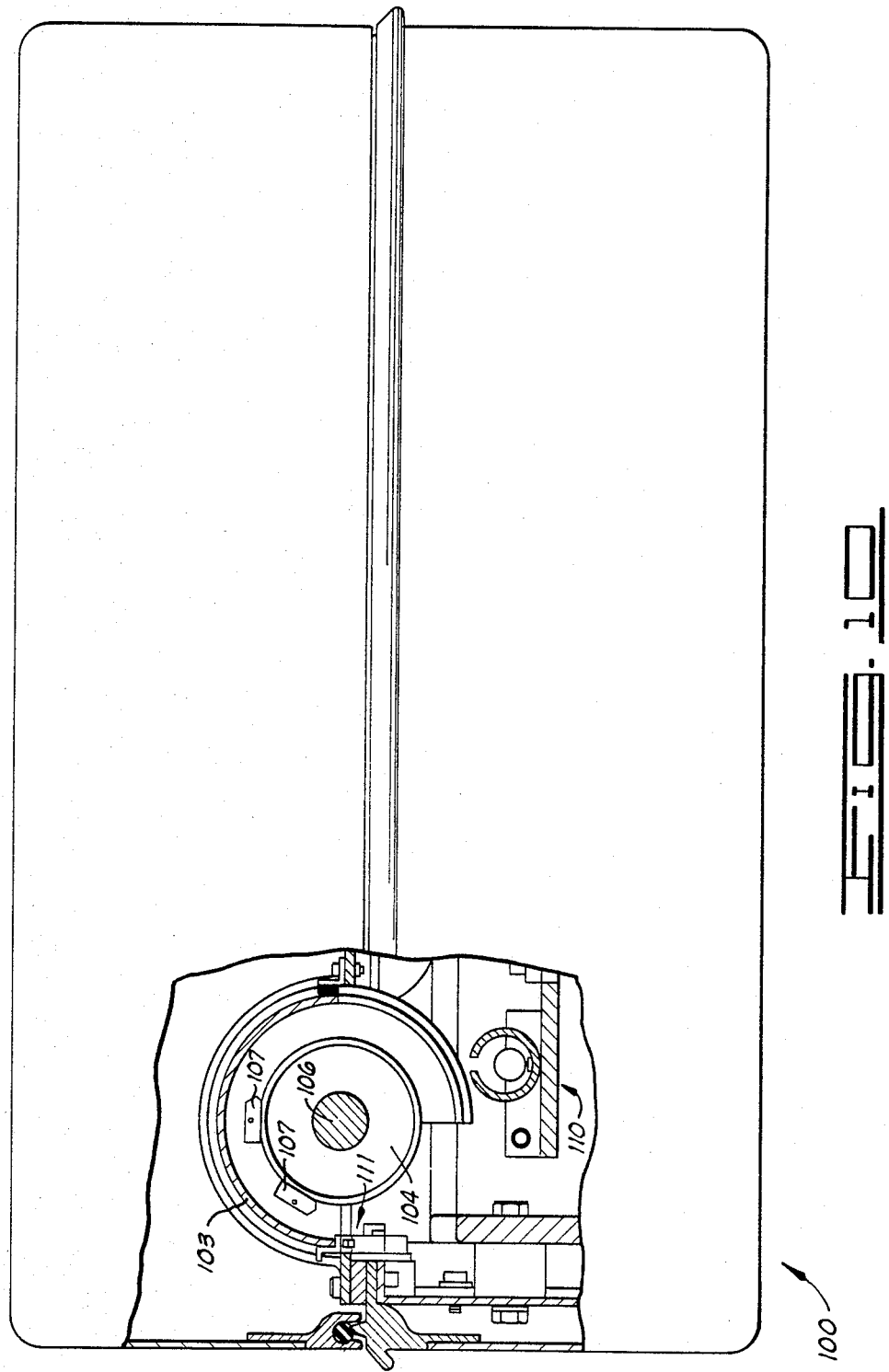

DATA CONVERSION, COMMUNICATION AND ANALYSIS SYSTEM

This invention relates generally to optical reader and data transmission and analysis systems and more particularly, but not by way of limitation, to an optoelectronic system for converting graphic data contained on a drill stem test chart into electrical binary signals and for manipulating the signals so that the pertinent data can be transmitted to a central computer within the system for analysis.

During the drilling of an oil or gas well it is often desirable to determine the pressure-flow characteristics of the formation into which the well is drilled. This is desirable because the formation pressure-flow information can assist a properly trained person in evaluating whether the well is more or less likely to produce and, if it is likely to produce, in what relative quantities it can be expected to produce. A formation pressure response can also be used to determine what type of well treatment is advisable. Such a determination can be made because the transient response of the formation pressure as a function of time provides means for determining the permeability and other properties of the reservoir. In general, the information which can be derived from a formation pressure-flow reading can be used by the well operator to decide whether to complete, stimulate or abandon the formation.

One manner of obtaining formation pressure-flow data and of analyzing this data is to perform a drill stem test which includes placing a bourdon tube pressure recording device in a test string which is lowered into the well in which the formation pressure is to be recorded. Attached to the bourdon tube is a marking stylus which scribes, in response to formation pressures sensed by the bourdon tube, a graph on a black-coated metal drill stem test chart which moves relative to the stylus. The resultant graph is a record of the pressure sensed by the bourdon tube as a function of time.

Once such a drill stem test chart has been marked at the drill site with a pressure graph, the chart is mailed to a company which provides the service of analyzing the graphic data contained on the chart. Such a company has skilled employees who manually read the chart and convert the graphic data into numerical form for mathematical manipulation by a computer or other calculating means. The computer or other calculating means translates the actual test data (i.e., the converted graphic data) into formation properties needed to guide the well operator's decision to complete, stimulate or abandon the formation. The translation occurs through the use of basic equations and formulas generally known in the reservoir evaluation art.

As the translation process occurs, and thereafter, an expert analyzes the information and prepares a written report containing the facts and the opinions of the expert which the well operator uses in formulating his opinion. Once the report is completed, it is mailed to the customer or well owner.

This manner of processing formation pressure data is time-consuming because mailing the chart to an analysis company, waiting for the analysis to be made, and receiving the report of the analysis by return mail takes several days. The manual reading of each pressure chart also consumes time and permits human error to occur because of the difficulty in accurately and consistently reading charts of the type produced by the aforementioned manner of recording formation pressure. These shortcomings of this type of system are critical because during the interim between the preparation of the formation pressure chart and the receipt of the report, the drilling operation ceases. This is costly because the per day expenses for a drilling rig and a crew can be thousands of dollars.

Another system for preparing and analyzing formation pressure charts includes the utilization of one or more experts in the field at the drilling site. These experts read the charts prepared with a bourdon tube pressure recording device and manually convert the graphic data into numerical form for entry into a computer or other calculating means located either at the drilling site or remotely therefrom.

A shortcoming of this system is the expense of having one or more experts maintained in the field. Additionally, there are not enough qualified experts to be retained on each site of all wells when it is necessary to prepare and analyze formation pressure charts.

Still another system for recording formation pressure and for analyzing the pressure data includes real-time electronic sensing and encoding means placed in a downhole tool. Such means senses the pressure and converts it into numerical format for transmission to a computer electrically connected to the sensing and encoding means.

Although such a system saves the time and expense of having an expert read and convert the chart from graphic format to numerical format, this third system is expensive because of the nature of the equipment necessary to construct the system. Additionally, to permit electrical communication between the downhole tool and the equipment located at the surface, a wireline must be run into the well. The presence of the wireline in the hole increases the hazard of blow-outs as known in the art. Still further, this third system is susceptible to malfunction in high temperature areas which are often encountered when making formation pressure recordings.

In view of the shortcomings of the aforementioned systems, there is the need for a system which can relatively quickly convert graphic data (such as appears on a formation pressure chart) or other indicia into electrical signals for computerized numerical processing, which can relatively quickly transfer these signals from a field site at which the data are obtained to an analysis station for calculation and evaluation purposes so that delays through the mail are prevented, and which can prepare a report for transfer back to the field site.

To make such a system compatible with existing tools, such as a bourdon tube pressure recording device and the charts produced thereby, and to reduce the time and expense of having experts manually read the charts, the system should include means for automatically optically reading a chart with graphic or other data scribed or otherwise contained thereon.

To enhance such a system, it should be constructed so that non-experts in the field at the locations where the graphic data are generated (e.g., a drilling site) can use the system with little training to initiate a conversion, communication and analysis procedure.

Because the data to be converted into numerical format may include extraneous information which need not be transmitted to the analysis station, it is also desirable that such a system include means for relatively quickly and automatically detecting the pertinent information and sending that information to the analysis station.

This system should also include means for providing a human/computer interface at the analysis station so that, if desired, an expert can manually manipulate the information received from the field and can interact with a computer at the analysis location.

So that a person in the field who initiates a data conversion, communication and analysis request can verbally communicate with the analysis station, the system should include means for establishing verbal communication from the field site to the analysis station.

The present invention overcomes the above-noted and other shortcomings of the aforementioned prior art systems by providing a novel and improved optical reader and data transmission and analysis system. This system meets each of the needs set forth hereinabove.

With particular reference to the analysis of graphic drill stem test data obtained at a drilling site, the present invention provides an apparatus for optoelectronically processing such data. This apparatus comprises a drill stem test chart having a surface on which the graphic drill stem test data are recorded, optoelectronic means for automatically scanning the drill stem test chart and for automatically converting the graphic drill stem test data thereon into electrical signals, and computer means for analyzing the electrical signals and for providing an output descriptive of the graphic drill stem test data. The apparatus further comprises transmission means for transferring the electrical signals from the optoelectronic means to the computer means.

The optoelectronic means includes reader means for viewing the surface of the chart as an array of discrete informational units and for generating for each discrete unit a respective binary bit having one of two logic values depending upon whether the respective unit is relatively light or relatively dark. The optoelectronic means further includes data compressor means for converting those of the binary bits having a predetermined one of the two logic values into the electrical signals provided by the optoelectronic means for transmission into the computer means via the transmission means.

The computer means includes graphic terminal means for permitting a person to manipulate the computer means and the electrical signals passed to it over the transmission means.

The apparatus further comprises verbal communication means, associated with the computer means, for receiving and recording a verbal communication from a person located at the drilling site.

The present invention more broadly provides an apparatus for optoelectronically processing graphic data or other indicia. The apparatus comprises a local station and a central station. The local station includes reader means for scanning the graphic data or other indicia and for converting the scanned material into a series of first binary signals, each of which has a respective first or second logic value. The local station also includes data compressor means for passing primarily only those of the first binary signals having the first logic value. Also included in the local station is microcomputer means for receiving those of the first binary signals passed by the data compressor means and for converting the received first binary signals into a series of second binary signals which in the preferred embodiment represent the vectorization of sets of the first binary signals.

The central station includes call receiving means for receiving the second binary signals from the microcomputer means and for receiving and recording verbal communications from the local station. The central station also includes graphic terminal means and computer means. The graphic terminal means permits the manipulation of the graphic data or other indicia represented by the second binary signals. The computer means is responsive to the call receiving means and the graphic terminal means for analyzing the second binary signals as manipulated by the graphic terminal means.

Therefore, from the foregoing, it is a general object of the present invention to provide a novel and improved optical reader and data transmission and analysis system. Other and further objects, features and advantages of the present invention will be readily apparent to those skilled in the art when the following description of the preferred embodiment is read in conjunction with the accompanying drawings.

FIG. 1 is a functional block diagram of the preferred embodiment of the present invention.

FIGS. 2A–2B form a functional block diagram of the preferred embodiment of the reader unit of the present invention.

FIG. 4 is a functional block diagram of the preferred embodiment of the central computer subsystem of the present invention.

Figure 2A:
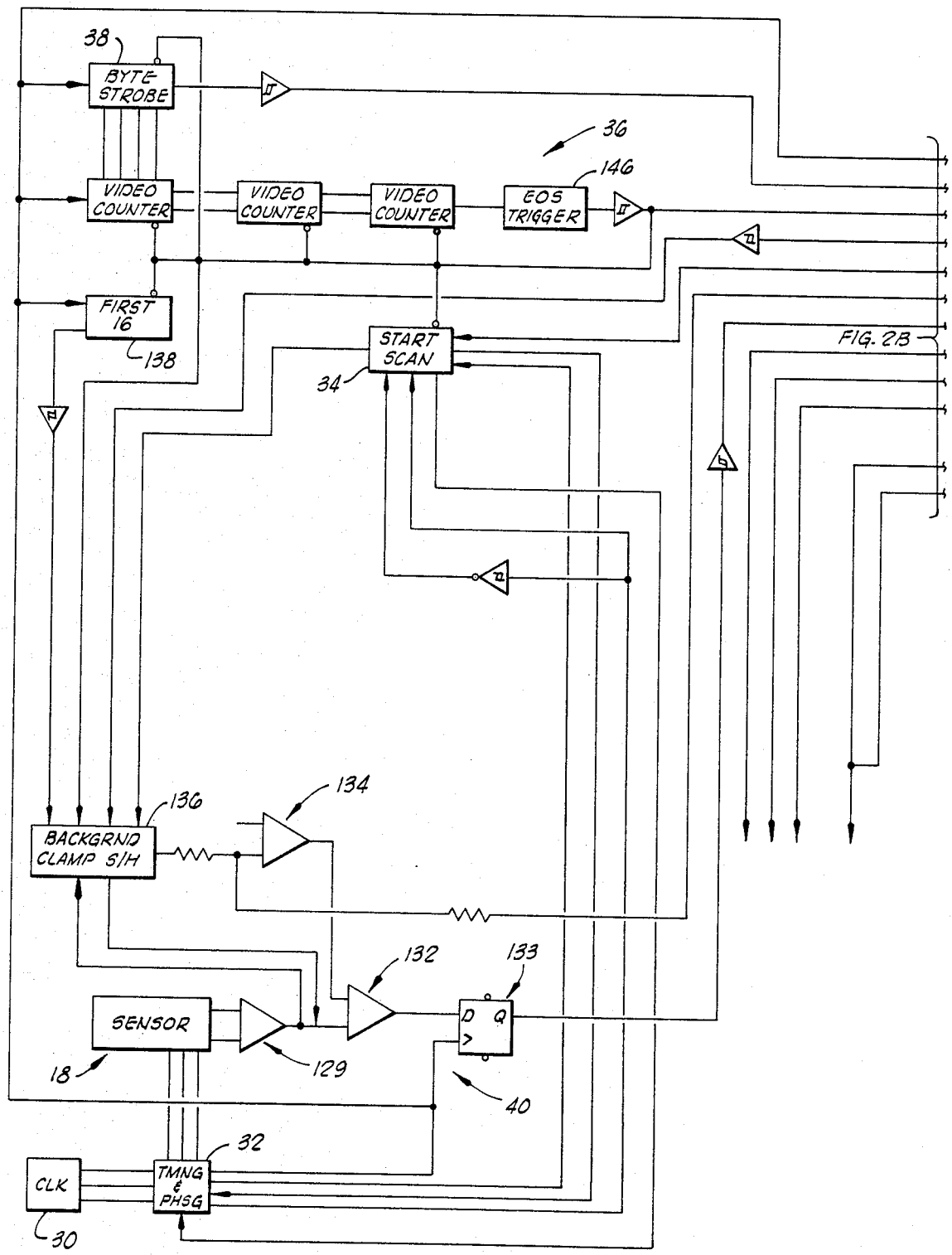

FIGS. 5A–5B form a top plan view of the preferred embodiment of the reader unit of the present invention.

FIGS. 6A–6B are a schematic circuit diagram of the preferred embodiment of the video section and of a portion of the timing section of the reader unit.

FIGS. 7A–7B are a schematic circuit diagram of the preferred embodiment of another portion of the timing section of the reader unit.

FIGS. 8A–8C are a schematic circuit diagram of the preferred embodiment of the motor control section of the reader unit.

FIGS. 9A–9D are a schematic circuit diagram of the preferred embodiment of the interface section of the processor unit.

FIG. 10 is a partial sectional side elevational view of the preferred embodiment of the reader unit of the present invention.

With reference to the drawings, the preferred embodiment of the present invention will be described. FIG. 1 discloses a block diagram of the preferred embodiment of the present invention adapted for reading and processing formation pressure charts of the type obtained from a bourdon tube pressure recording device. The preferred system shown in FIG. 1 includes a local station or field subsystem 2 including a reader unit 4 and a processor unit 6. The preferred embodiment also includes a central station identified in FIG. 1 as a central computer subsystem 8. Communications between the local station 2 and the central station 8 are maintained via suitable transmission means shown in FIG. 1 as a telephonic network 10. The preferred embodiment which is adapted for reading and processing formation pressure charts also includes a chart 12 schematically illustrated in FIG. 1.

Chart 12 has scribed thereon graphic data 14 representing, in the preferred embodiment, pressure versus time information. The chart 12 in the preferred embodiment is a brass plate having a flat black coating which, when scribed by the bourdon tube pressure recording device stylus, yields a relatively light line on a relatively dark background. Although the preferred embodiment is disclosed to be used with such a chart having light indicia on a dark background, it is contemplated that the present invention can be used with dark indicia on a light background and with other indicia other than graphic data. In the preferred embodiment the chart has a surface having a size approximately four inches by five inches on which the graph 14 is recorded. Specifically, in the preferred embodiment the chart 12 is a drill stem test chart having graphic drill stem test data recorded thereon.

The local station 2 provides an automatic reader subsystem which accurately reads the drill stem test charts at the field location and translates the graphic information on the charts into a numerical form which can be transmitted by telephone lines to the central computer subsystem 8 for analysis. The automatic reader subsystem is constructed to be powered from a standard commercial power source. Control is maintained with minimal operator interaction so that nonexperts can operate the equipment of the automatic reader subsystem. The subsystem operates so that marks outside the hydrostatic lines can be ignored in the preferred embodiment adapted to be used with formation pressure charts of the type described hereinabove. Broadly, the automatic reader subsystem is a microprocessor-based data conversion, compression and transmission instrument which comprises the reader unit 4 and the processor unit 6. The reader unit 4 and the processor unit 6 form optoelectronic means for automatically scanning the drill stem test chart 12 and for automatically converting the graphic drill stem test data thereon into electrical signals.

FIGS. 2A–2B form a functional block diagram of the preferred embodiment of the reader unit 4. The reader unit 4 provides means for viewing the surface of the chart 12 as an array of discrete informational units and for generating for each discrete unit one, and only one, respective binary bit having one of two logic values depending upon whether the respective unit is relatively light or relatively dark, as determined by comparison with a presettable threshold.

The reader unit 4 includes mount means for holding the chart 12 having the graphic data 14 thereon. The mount means is schematically shown in FIG. 2B as a drum or spindle or other rotatable element identified by the reference numeral 16. The drum 16 is illustrated as having the chart 12 mounted thereon.

The reader unit 4 also includes sensor means 18 for sensing the graphic data and for converting the sensed graphic data into corresponding electrical signals. So that the chart 12 mounted on the drum means 16 is movable past the sensor means 18 in a first direction, the reader means 4 further includes first drive means shown in FIG. 2B as including a drum motor 20 and a drum motor control circuit 22. The drum motor control circuit 22 has movement detection and encoding means 23 associated therewith for detecting how far and how fast the drum 16 is rotated by the motor 20.

The reader unit 4 further comprises second drive means including a stepper motor 26 and a stepper motor control circuit 28. The second drive means moves the sensor means 18 in a second direction relative to the graphic data 14 contained on the chart 12 mounted on the drum 16. In the preferred embodiment the first drive means rotates the drum 16 and the chart 12 mounted thereon in front of the sensor means 18, and the second drive means moves the sensor means 18 in a direction parallel to the longitudinal axis (i.e., the axis of rotation) of the drum 16.

To coordinate the operations of the sensor means 18, the first drive means and the second drive means so that discrete portions of the graphic data are sequentially read, the preferred embodiment of the reader unit 4 also includes timing means. The timing means includes clock generator means 30, timing and phasing means 32, start scan logic means 34, video counter means 36, and byte detecting means 38.

To determine whether a detected portion of the chart 12 is light or dark, the reader unit 4 includes a video portion which comprises the sensing means 18 and binary conversion means 40 for comparing each of the electrical signals provided by the sensor means 18 to a predetermined threshold level and for converting the electrical signals from the sensor means 18 above the threshold value into respective binary bit signals each having a first logic value and for converting those electrical signals from the sensor means 18 below the threshold value into respective binary bit signals each having a second logic value.

FIG. 2B further shows that the reader unit 4 also includes a lamp and motor triac control circuit 42, camera power supply means 44, and power regulating means 46.

Each of the foregoing elements of the reader unit 4 will be more fully described hereinbelow after the following description of the functional diagrams shown in FIGS. 3 and 4.

Figure 3:
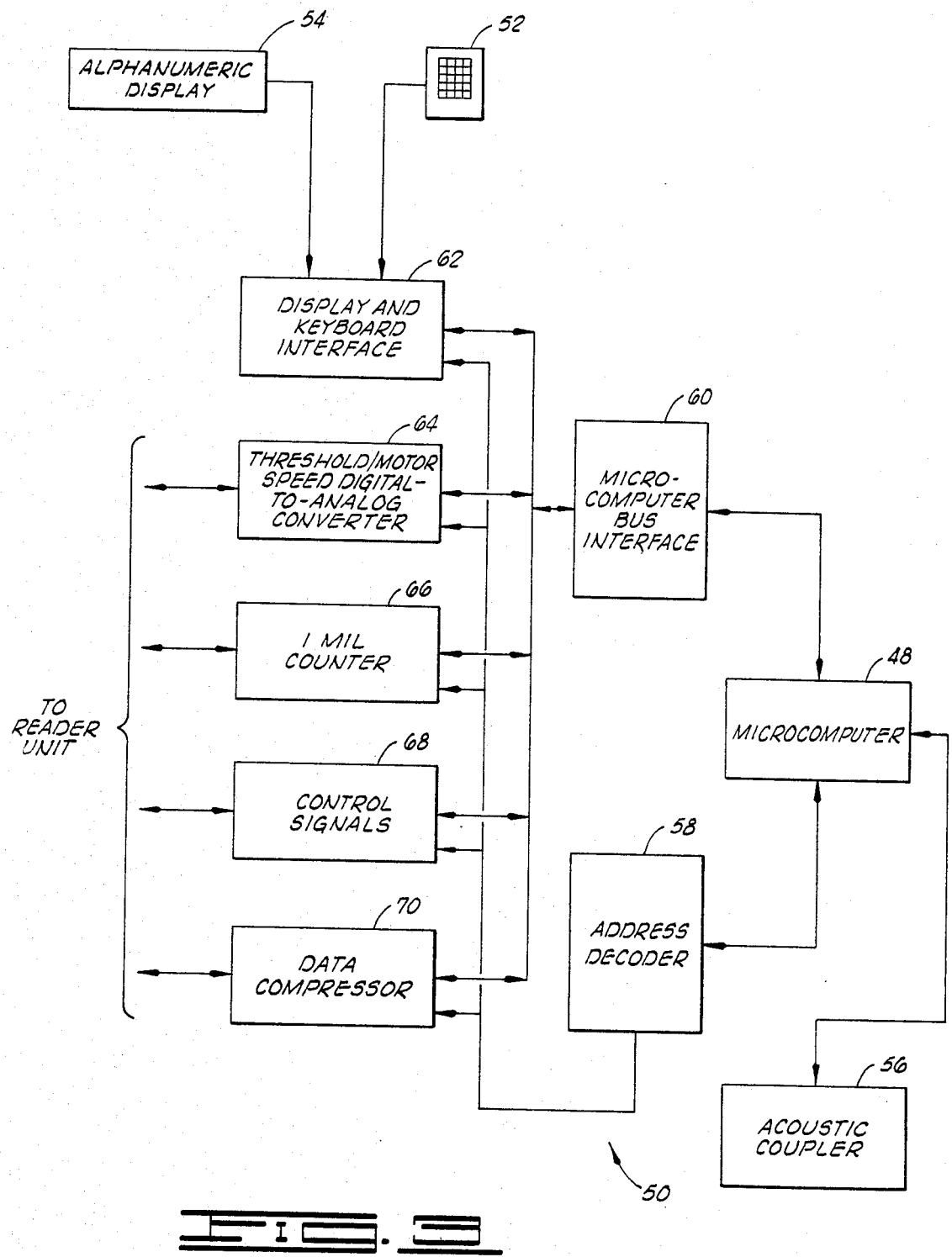
FIG. 3 is a functional block diagram of the preferred embodiment of the processor unit of the present invention.

The functional diagram of FIG. 3 illustrates the construction of the preferred embodiment of the processor unit 6. The processor unit 6 includes microcomputer means 48 including in the preferred embodiment a Digital Equipment Corporation LSI-11/23 16-bit microprocessor, 64k words of read/write memory (RAM), and 16k words of non-volatile program and data table memory (ROM). The microcomputer means 48 controls the operation of the field unit 2 from power-up to power-down.

The 64k words of RAM are used to store answers to a question and answer session conducted by the microcomputer 48 with an operator located at the local station 2. This memory is also used to store data which are collected by the sensor means 18 and compressed as subsequently described, program segments which are currently being executed, and vectorized data which are compiled for transmission to the central computer subsystem 8.

The 16k words of ROM contain all the words of the programs needed to operate the reader unit 4 and processor unit 6 of the field subsystem 2. The ROM of the preferred embodiment includes EAROM, EPROM or other suitable memory elements.

The processor unit 6 also includes interface means 50 for interfacing the reader unit 4 components with the processor unit 6. The interface means 50 also provides connections for a keyboard 52 (such as a 4×5 key array keypad) and a display means 54 (such as an alphanumeric display) which are associated with the processor unit 6 for entering information into and displaying information from the subsystem 2. The processor unit 6 also includes audio tone generator means (not shown) which is actuated at appropriate times to signal the person operating the field subsystem 2.

The processor unit 6 also includes acoustic coupler means 56, such as a modem having rubber cups into which the mouthpiece and earpiece of a telephone fit, by which the field subsystem 2 is interfaced to the transmission means 10 for communicating with the central computer subsystem 8.

The interface means 50 more particularly includes address decoder means 58, microcomputer bus interface means 60, display and keyboard interface means 62, threshold/motor speed digital-to-analog converter means 64, one mil counter means 66, control signal means 68, and data compressor means 70. These elements will be more particularly described hereinbelow with reference to FIGS. 9A–9D.

Before a more detailed description of the reader unit 4 and the interface means 50 of the processor unit 6 is given, a description of the central computer subsystem 8 will be given with reference to FIG. 4. FIG. 4 discloses the subsystem 8 contains redundant elements which are indicated by identical reference numerals.

The central computer subsystem 8 includes verbal communication means associated therewith for receiving and recording a verbal communication from a person located at the field subsystem 2. The verbal communication means is identified in FIG. 4 as a portion of a call receiving station 72. The call receiving station 72 receives the electrical signals constituting the converted graphic data transmitted from the local station 2 and also receives and records verbal communications from the local station 2.

The call receiving station 72 includes modems 74 and telephone answering machines 76 of the types known in the art. FIG. 4 indicates there are a plurality of modems 74 so that a plurality of local stations 2 can be connected to a single central computer subsystem 8. Numerical data corresponding to the graphic data taken from the chart 12 are received via the modems 74 and transferred to central computer means 78. The telephone answering machines 76 record the verbal communications on suitable recording media which can be transcribed by an operator at the central computer subsystem 8.

The central computer means 78 includes two minicomputers specifically shown in the preferred embodiment illustrated in FIG. 4 as being Digital Equipment Corporation PDP-11/34 minicomputers each having the specified controllers, memory, and interface devices also manufactured by Digital Equipment Corporation. In addition to these elements, the central computer means 78 has associated therewith auxiliary controller means 80 and high speed interface means 82.

The preferred embodiment of each of the auxiliary controller means 80 includes an LSI 11 microcomputer which is programmed to control multiplexer means 84, printer/plotter means 86 and a cursor box 88.

Each of the high speed interfaces 82 provides means by which the central computer means 78 can communicate with a high speed graphics display means for manipulating the graphic data represented by the electrical signals transmitted by the field subsystem 2 to the central computer subsystem 8. In the preferred embodiment each interface 82 is of the type disclosed in the Appendix forming a part of this specification and in U.S. patent application Ser. No. 436,128, entitled "Interface Apparatus and Method for Host Computer and Graphics Terminal" and assigned to the assignee of the present invention, which application is incorporated herein by reference. The graphics means includes a display terminal 90 which, in the preferred embodiment, is a Tektronix 4014-1 graphics terminal. Associated therewith are the cursor box 88 and a Tektronix 4631 hard copy unit 92 for providing hard copy output.

The central computer subsystem 8 also includes alphanumeric display terminals 94 for displaying control and status information and local reader/processor units 96 identical to the field subsystem 2.

The central computer subsystem 8 also includes manual readers and encoders, or chart digitizers, 98 of the type known in the art for use by a person to manually examine and digitize a chart. By means of one of the chart digitizers 98 a person can manually scan a chart and convert selected points into digital electrical signals which can be provided to the computer means for analysis.

The central computer subsystem 8 provides computer means for analyzing the electrical signals sent from the optoelectronic means 2 and for providing an output descriptive of the graphic drill stem test data. The computer means is responsive to the call receiving means 72 and the graphic display means for analyzing the electrical signals as manipulated by the graphics display means.

In the preferred embodiment the drill stem test chart 12 and the optoelectronic means 2 are located in the field at a site remote from the central computer, such as at a drilling site or field site. The central computer subsystem of the preferred embodiment is located at a central receiving and processing location, such as a company headquarters.

With reference to FIGS. 5A–8C the preferred embodiment of the reader unit 4 will be described. FIGS. 5A–5B schematically illustrate the preferred assembly of the reader unit 4 contained in a portable container or housing 100 of a size suitable for being hand-carried by a person. In the preferred embodiment the container or housing 100 is substantially the size of a suitcase. The container 100 is preferably constructed of a durable substance to protect the reader unit 4 contained therein in the harsh environments in which the present invention is contemplated to be used. Mounted in the container 100 are electrical connectors 102 to which a cable (not shown) is connected for electrically coupling the reader unit 4 to the processor unit 6 which is contained in another housing similar to the housing 100 and which is used locally with the reader unit 4.

One element of the reader unit 4 shown in FIGS. 5A–5B is a drum or spool 104 which is integrally formed on a shaft 106 in the preferred embodiment and on which the chart 12 is mounted and held in place by clips 105 and blocks 107. The drum 104 corresponds to the drum 16 schematically illustrated in FIG. 2B and is made of stainless steel in the preferred embodiment. Each of the blocks 107 is adjustably mounted on the drum 104 by adjustment means shown as two screws in FIG. 5B. Each of the clips 105 is pivotally mounted between respective ones of the blocks 107 by a rod. The clips 105 are variably positionable adjacent the drum 104 by appropriately tightening or loosening each of the screws. To protect the drum 104 and the chart 12 during operation of the present invention, the reader unit 4 also includes a drum cover 103 (see FIG. 10) whose open or closed status is monitored by the processor unit 6 to insure that the cover 103 is closed during a reading operation of the present invention. The cover 103 is slidably disposed in a track formed in housing 100 so that when the upper and lower portions of the housing 100 are connected as illustrated in FIG. 10, the cover 103 can be moved from a closed position (the position of the cover 103 shown in FIG. 10) to an open position in which the cover is disposed below, or underlies, the drum 104 to catch the chart if it is dropped during the time one is trying to clip the chart to the drum or if it is otherwise not properly received by the drum 104 when the cover is at the open position. When the cover 103 is closed, it engages a switch means 111 to signal that the cover is closed.

To rotate the drum 104 in a controllable manner, the reader unit 4 also includes a drum motor (corresponding to the motor 20 shown in FIG. 2B) which is contained in a housing 108 shown in FIG. 5B and which is coupled to the drum 104 and shaft 106 by suitable means for transferring rotary motion from the motor to the drum 104. The precise position and speed of the drum 104 or the shaft 106 is measured electronically by a position encoder means 109 of a type known in the art. The encoder 109 is illustrated in FIG. 2B as the element 23. When the motor rotates the drum 104 during a reading operation, an illumination means, such as a lamp 110, is energized to illuminate the chart 12 positioned on the drum 104. The lamp 110 is prevented from being illuminated whenever the cover 103 does not engage the switch means 111. This prevents the lamp from damaging the cover 103 by being illuminated when the cover 103 is in its open position.

To receive light which is reflected by the chart 12, the reader unit 4 also includes light receiving means comprising the sensor means 18 which in the preferred embodiment includes a camera lens 112 and a photo-responsive element such as a Fairchild CCD 142 optical sensor (not shown in FIGS. 5A-5B). The camera lens 112, the photo-responsive element and the associated conditioning and timing circuitry are mounted on a suitable carriage means 113.

Because the camera lens 112 and the photo-responsive element are unable to detect the entire width of the chart 12 from a single position relative to the drum 104, carriage movement means is provided in the reader unit 4. The carriage movement means includes in the preferred embodiment shown in FIGS. 5A-5B a ball bearing lead screw 114 extending axially through a complementally constructed ball nut assembly 116 on which the camera lens 112 and the sensor means are mounted. The carriage movement means also includes a stepper motor 118 (corresponding to the motor 26 shown in FIG. 2B) which is controlled to precisely position the camera lens 112 and the associated photo-responsive element so they detect segments of the chart 12 as it is rotated by the drum motor disposed in the housing 108.

These elements of the reading unit 4 are suitably retained in the container 100 and cushioned therein so that they are relatively protected.

Also suitably mounted within the container 100 are printed circuit boards containing the circuits which are schematically illustrated in FIGS. 6A-8C. These drawings disclose the preferred embodiments of the circuits for implementing the functional elements shown in FIGS. 2A-2B.

FIG. 6A discloses the preferred embodiment circuits for the clock generator means 30, the timing and phasing means 32, and the sensor means 18. The clock generator means 30 includes an integrated circuit timing pulse generator means 120 which is connected in the preferred embodiment to provide a nominal frequency of 3.00 MHz. The timing signal from the clock generator means 30 drives a plurality of flip-flops 122 included within the timing and phasing means 32.

The timing and phasing means 32 provides four output signals. One of the outputs is identified as the ORG signal and the other three outputs are identified as being connected to a Fairchild CCD 142 integrated circuit chip 124 previously mentioned as forming a part of the sensor means 18. The three outputs connected to the sensor means 18 control the operation of the photo-responsive element 124.

The photo-responsive element 124 also has connected thereto suitable circuit means 126 of a suitable type as is known in the art. The element 124 provides an output along a conductor means 128 which is connected to an input of a video amplifier means 129 forming a part of the binary conversion means 40 and having a preferred embodiment circuit as shown in FIG. 6B.

The video amplifier means 129 appropriately amplifies the output signal received along the conductor means 128 from the integrated circuit optical sensor 124. The amplified signal from the video amplifier means 129 is provided to a first input of a comparator means 132 having a preferred embodiment as shown in FIG. 6B.

Connected to a second input of the comparator means 132 is the reference level signal which is used to determine whether a relatively dark portion or a relatively light portion has been detected on the chart 12. If the video amplifier output signal is below the value of the reference signal on the second input of the comparator means 132, a relatively dark portion has been detected; if the video amplifier output signal is above the reference level signal, a relatively light portion of the chart 12 has been detected.

When a relatively dark portion has been detected, a flip-flop 133 provides a binary bit in the form of an electrical signal having a magnitude representing a low or "0" logic level. When a relatively light portion has been detected, the flip-flop 133 provides a binary bit in the form of an electrical signal having a magnitude representing a high or "1" logic level. These binary bits form the binary video signals labeled in FIG. 6B.

The reference level signal is determined by summing, via a summing means 134, a threshold signal generated by the processor unit 6 and a signal provided by a black background clamp sample hold means 136 having a preferred embodiment circuit shown in FIG. 6B. The black background clamp sample hold means 136 is responsive to a valid video signal initiated by a first-sixteen counter means 138 shown in FIG. 2A (and more particularly shown in FIG. 7B) and a chart valid signal generated in the processor unit 6 in response to an indexing signal and a one mil signal shown in FIGS. 8B and 9C.

The elements 129, 132, 133, 134, 136 and 138 form the binary conversion means 40 shown in FIG. 2A.

FIGS. 7A-7B show additional preferred embodiment circuits of the reader unit 4. Shown in FIG. 7A are the start scan logic means 34 and the byte strobe means 38.

The start scan logic means 34 includes flip-flops 140 which are responsive to a reset signal provided by the timing and phasing means 32 shown in FIG. 6A. The flip-flops 140 provide a set signal and a start scan signal which are transmitted to the timing and phasing means 32 as shown by the continuous lines which are similarly labeled in FIG. 6A and FIG. 7A.

The start scan logic means 34 also includes flip-flops 142 which are responsive to the one mil signal subsequently described and the clock signal from the clock generator means 30 shown in FIG. 6A.

The byte strobe means 38 includes combinational logic byte detecting means 144 shown in FIG. 7A. The byte detecting means 144 is responsive to the video counter means 36 particularly shown in FIG. 7B and to the ORG signal provided by the timing and phasing means 32. In the preferred embodiment the byte detecting means 144 is responsive to each eighth count counted by the video counter means 36 so that a byte strobe signal is provided thereby defining a byte of video information to include eight bits as will become clearer hereinafter.

FIG. 7B discloses the first-sixteen counter means 138, the video counter means 36 and an EOS trigger means 146.

The first sixteen counter means 138 generates the valid video signal after sixteen ORG pulses have been detected after the receipt of an EOS signal.

The video counter means 36 includes three binary counter integrated circuits which count 2,048 ORG pulses before activating the generation of the EOS signal. The signal from the video counter means 36 indicating that 2,048 pulses have been counted is provided to the EOS trigger means 146 for generating the EOS signal.

As will be understood upon an examination of the schematic circuit diagrams, the ORG signal is the primary clocking signal and the EOS signal is the primary resetting signal of the present invention. The one mil signal is the primary "start scan" signal.

FIG. 8A discloses the preferred embodiment circuit of the stepper motor control means 28 for providing the drive energization to the stepper motor 118 shown in FIG. 5A and corresponding to the motor 26 shown in FIG. 2B. The stepper motor control means 28 includes left and right limit switch inputs 148 which are connected to suitable switch means 149 (shown in FIG. 5B) which can be actuated to limit the left and right movement of camera lens 112 and photo-responsive element 124 along the screw 114 shown in FIG. 5B. Movement is limited by appropriate control signals being generated by the processor means in response to the detection thereby of a closure of either of the limit switches.

The stepper motor control means 28 also includes inputs for receiving a step trigger signal and a direction signal from the processor unit 6 for controlling a stepping motor control integrated circuit means 150 of the type known in the art. The integrated circuit means 150 provides the proper sequence of signals to drive transistors 152 which interface the stepper motor control means 28 to the stepper motor 118 to thereby cause the motor 118 to provide either forward or reverse rotation.

In the preferred embodiment the stepper motor control means 28 is controlled by the processor unit 6 to move the camera lens 112/integrated circuit sensor 124 combination in precise increments so that strips or segments of the chart 12 are read as the drum 104 rotates. Once a strip or segment of the chart 12 has been read, the stepper motor control means 28 is activated to drive the stepper motor 118 so that the camera lens 112 and the integrated circuit sensor 124 are moved a predetermined distance to read the next strip or segment of the chart 12.

FIG. 8B discloses the preferred embodiment circuits of the one mil buffer and drum motor control means 22. The preferred embodiment includes an encoder signal receiving section 154 which receives the input from the encoder 109 associated with the drum 104 (schematically shown in FIG. 2B as encoder 23 and drum 16). The encoder signal receiving section 154 detects when the drum motor in the housing 108 has rotated the drum 104 one mil. When this occurs, the encoder receiving section 154 provides a signal to a switch means 156. The switch means 156 is manually switchable to select as a one mil signal either the output of an EXCLUSIVE NOR gate 158 forming a portion of the encoder receiving means 154 or the output of an auxiliary timer means 160 for synthesizing or imitating the one mil signal so that the camera circuits can be tested without the drum 104 rotating.

Also included within the one mil buffer and drum motor control means 22 is a frequency-to-voltage converter means 162 which activates a drum motor drive circuit 164 to actuate and control the drum motor.

FIG. 8C discloses the preferred embodiment circuit of the lamp and motor triac control means 42, the camera power supply means 44, and the circuit elements utilized to provide regulated power sources. The lamp and motor triac control means 42 is responsive to a drum cover interlock signal indicating the status of the drum cover. When the drum cover 103 is closed (thereby engaging the switch 111), the lamp and motor triac control means 42 illuminates the lamp 110.

FIGS. 9A-9D disclose a schematic circuit of the elements contained on the interface board forming a part of the processor unit 6. FIG. 9A discloses the preferred embodiment of the address decoder means 58 and the data bus interface means 60. FIG. 9B discloses the preferred embodiment of the display and keyboard interface means 62. The data bus interface means 60 and the display and keyboard interface means 62 are controlled via the address decoder means 58. An examination of FIGS. 3 and 9A-9D shows that the address decoder means 58 likewise controls additional interface board elements more particularly schematically depicted in FIGS. 9C-9D.

FIG. 9C discloses the threshold/motor speed digital-to-analog converter means 64, the one mil counter means 66, and the control signal output means 68.

The threshold/motor speed digital-to-analog converter means 64 receives instructions over the data bus from the microcomputer portion of the processor unit 6. These instructions are received by digital-to-analog converters 166 and 168. The outputs of these elements drive suitable amplifier means which provide outputs connected to the respective portions of the reader unit 4 as identified by the common labels.

The one mil counter means 66 includes a plurality of integrated circuit counters 170 which are loaded by the index signal and are incremented by the one mil signal as shown in FIG. 9C. The outputs of the integrated circuit counters 170 and the logic signals of the right limit switch and the left limit switch are provided by the microcomputer means via the bus interface means 60.

The control signal output means 68 includes a latch 172 for receiving data from the microcomputer means and for retaining the data to provide the control signals as labeled in FIG. 9C.

FIG. 9D discloses the preferred embodiment circuit constructed to form the data compressor means 70 functionally shown in FIG. 3. The data compressor means 70 provides means for passing or transferring certain ones of the binary bits representing the data read from the chart 12 to the microcomputer means 48 of the processor unit 6, and the data compressor means 70 forms a hardware portion of a larger data compressor means contained within the processor unit 6 for converting first binary electrical signals received from the reader unit 4 into second binary electrical signals which are transmitted to the central computer subsystem 8 via the transmission means 10. The bytes having at least some of the binary bits having a predetermined one of two logic values are permitted to be transferred whereas the bytes having all of their binary bits having the other of two logic values are not transferred to the memory of the microcomputer means 48.

The compressor means 70 includes a byte counter means 174 which is responsive to the byte strobe control signal from the byte detecting means 144 for counting the number of bytes converted by the binary conversion means 40. The data compressor means 70 also includes binary bit signal storage means 176 for sequentially storing the binary bits within each byte of binary data. The data compressor means 70 still further includes control means 178 which is responsive to the byte strobe control signal and to the binary bit signals for transferring to the microcomputer means 48 the count of the byte counter means 174 and the binary bit signals of the binary bit signal storage means 176 when at least one of the stored binary bit signals has a first logic value.

The byte counter means 174 includes two up/down binary counter integrated circuits 180 and 182. These counters are responsive to the byte strobe signal so that the counters are incrementally counted up whenever the byte strobe signal is received. The byte counter means 174 is also responsive to the EOS signal for being reset. When the counters 180 and 182 attain their maximum count, a carry signal is provided along a conductor 184 as a control signal to the control means 178.

So that a particular byte count can be transferred to the microcomputer means of the processor unit 6, the byte counter means 174 also includes a byte counter buffer means 186 for interfacing the outputs of the counter means 180 and 182 to the data bus interface means 60.

The binary signal storage means 176 includes a shift register integrated circuit means 188 which receives the inverse of the binary video information from the reader unit 4 and which clocks this information into the shift register 188 under control of the inverse of the ORG signal. The output of the shift register means 188, which output represents eight bits of binary video information or one byte of binary video information, is transferred to the microcomputer means 48 via a video shift register buffer means 190.

The control means 178 includes the logic and memory elements shown in FIG. 9D. These elements include an AND gate 192, a first flip-flop 194, a second flip-flop 196, another AND gate 198, a third flip-flop 200, and a NAND gate 202. These elements are interconnected to provide a suitable control timing signal to request a direct memory access operation from the microcomputer means 48 of the processor unit 6 whenever it is determined by the control means 178 that one byte of information is present at the output of the shift register means 188 and that the corresponding number of the byte in the serial transmission of the video data is present at the output of the byte counter buffer means 186 and that one bit of the information contained in the shift register buffer means 190 is of a particular logic value.

The control means 178 performs this operation in response to the chart valid signal, the byte strobe signal, the ORG signal, the binary video signal and the carry signal provided along the conductor 184 extending from the counter means 180. In the preferred embodiment whenever a bit representing a logical one appears in the binary video string, the control means 178 transfers the byte containing that bit to the memory of the microcomputer means 48. Because the inverse of the binary video information is clocked into the shift register means 188, the actual logical value transferred to the microcomputer means 48 will have logical ones for black spots on the chart 12 and logical zeros for light spots on the chart 12.

The microcomputer means 48 of the processor unit 6 receives the video binary signals passed by the binary bit signal storage means 176. The microcomputer means 48 further compresses this data and thereby converts the video binary signals into second electrical signals which are transmitted via the transmission means 10 to the call receiving means 72 of the central station 8. When the second electrical signals are received by the call receiving means 72, they are transferred to the computer means of the central computer subsystem 8 for manipulation thereby and by the graphic terminal means so that an analysis of the information contained on the chart 12 can be made.

With reference to all the drawings, the operation of the preferred embodiment of the present invention will be given with reference to the contemplated use of reading and analyzing a drill stem test pressure chart.

Initially, to permit information concerning a particular read operation to be entered, edited or reviewed by the operator at the local station 2, the microcomputer means 48 includes a program for controlling a question-and-answer session. In the preferred embodiment wherein a drill stem test chart that is to be read and analyzed, the question-and-answer session includes two types of questions. One type pertains to formation/test data and the other to tool string data. For each of the two types of questions, answers are given by simply keying in the numerical or logical response using the keyboard 52. At the conclusion of the question-and-answer session, the local station 2 enters the chart-processing procedure which is described next with respect to the chart 12.

The chart 12 has scribed thereon the pressure versus time line 14. This line is created by placing the chart 12 in a downhole tool, such as described hereinabove, so that a pressure responsive member can scribe on the chart 12 the line representing the detected pressure over a known time period. The scribed line 14 in the preferred embodiment is a shiny line on a dark background because the chart 12 is a brass sheet coated with a flat, black paint. However, the present invention can be constructed to also function with a relatively dark indicia on a relatively light background.

Once a scribed chart is obtained, the chart is placed on the stainless steel drum 104 in a manner known in the art. Once the chart is mounted on the drum 104 and the apparatus at the local station 2 is actuated to read the chart, the light 110 is illuminated so that a brilliant light is reflected from the surface of the chart 12 into the eye of the camera lens 112 and to the photo-responsive element 124.

The shinier the surface of the chart, the less the light is diffused before reaching the camera lens; conversely, the duller the surface of the chart, the more the light is diffused. Based on the amount of diffusion, the video portion of the reader unit 4 classifies the light as either negligible or intense. Areas of the chart which reflect negligible light are considered black. Areas of the chart which reflect intense light are considered scribed lines.

The decision whether the reflected light detected by the camera lens 112 and the photo-responsive member 124 associated therewith constitutes a black area or a light area (which light area would indicate the scribed line 14) is made by the video portion of the reader unit 4. This portion is generally identified in FIG. 2A and more particularly shown in FIGS. 6A and 6B. Broadly, these elements compare the analog signal from the CCD 142 sensor 124 (the photo-responsive member) with the reference level established at the output of the summing means 134. If the analog signal from the sensor 124 is below the reference level, the video portion determines that a dark region has been observed; if the analog value is above the reference level, the video portion determines that a light area has been detected. Corresponding to this determination, if a dark area has been detected, the output of the latch means 133 provides a logical low level or "0" bit; if a light area has been detected, the output of the latch means 133 is a logical high level or "1" bit. The series of electrical zeros and ones provided by the latch means 133 constitutes the binary video signal labeled in the drawings.

To read the entire chart 12, the present invention divides the chart 12 into discrete areas which are viewed and then converted into respective binary bits depending upon whether the viewed area is determined to be a dark or a light area. In the preferred embodiment the chart 12 is a four inch by five inch metal sheet. The surface of this chart in which the pressure versus time graph is scribed is viewed as a collection of one-half mil by one mil areas. By viewing the chart 12 in this manner, the preferred embodiment of the present invention converts the four inch by five inch surface area into $4 \times 10^7$ bits of serial binary data when an entire chart has been read. It is to be noted that different types, sizes and areas of the charts or other media can be read by the present invention, but the preferred embodiment disclosed herein is particularly adapted to read four-inch by five-inch drill stem test charts in one-half mil by one mil areas.

The surface of the chart 12 is specifically read by means of the microcomputer means 48 controlling the operation of the drum motor in the housing 108 (motor 20 in FIG. 2B) and the stepper motor 118 (motor 26 in FIG. 2B). The drum motor is controlled to rotate the chart 12 mounted on the drum 104 in one mil increments. This control is achieved through feedback provided by the encoder means 109 (encoder 23 in FIG. 2B) which detects how far the drum 104 is rotated by the drum motor.

The stepper motor 118 is controlled to move the camera lens 112 and the photo-responsive element 124 in four increments axially with respect to the length of the drum 104. In particular, the drum motor is actuated and the lamp 110 is illuminated, then the stepper motor 118 is actuated to move the camera lens 112 and photo-responsive element 124 to the right end of the chart 12 mounted on the drum 104. This positions the camera lens 112 and the element 124 to read one-fourth of the dimension of the chart 12 extending axially or longitudinally along the drum 104. Next, the chart on the drum 104 is sampled in one mil increments until the entire quarter strip is read. Thereafter, the stepper motor 118 is actuated to move the camera lens 112 and element 124 one increment to the left to read the next quarter strip of data contained on the chart 12. The chart on the drum is read again until the entire strip is read. Similarly, the third and fourth quarter strips to the left of the first two strips are read by the camera lens and photo-responsive element.

Upon reading the entire chart, the stepper motor 118 is actuated to return the camera lens 112 and photo-responsive element 124 to the right-most position and the drum motor is deactivated to stop the drum 104 from rotating. The read lamp 110 is then extinguished.

Through this procedure each of the one-half mil by one mil areas is viewed and analyzed to be either a light or dark area as signified by the electrical "ones" and "zeros" of the binary video stream of electrical binary signals.

Timing control for the reading operation is maintained by the timing portion of the present invention generally shown in FIG. 2A and more particularly shown in FIGS. 6A and 7A–7B. The primary timing signal is the ORG signal generated by the timing and phasing circuit 32 shown in FIG. 6A. After the first sixteen pulses of the ORG signal have been counted by the first sixteen counter means 138 shown in FIG. 7B, the present invention determines that valid video information can be received. This is indicated by the valid video signal labeled in FIG. 7B.

Once valid video is determined to exist, the video counter means 36 counts up to 2,048 pulses of the ORG signal. When this maximum count is reached, the EOS signal is generated by the EOS trigger means 146 to reset the timing of the apparatus.

Because the transmission line over which the serial electrical signals representing the light and dark areas of the chart 12 are transmitted has a limited bandwidth which limits the transmission rate to, for example, 300 baud, it is desirable to include in the present invention some means for compressing the quantity of data (e.g., the $4 \times 10^7$ bits of information read from the drill stem test chart 12) so that the transmission time for transmitting the information is reduced to a relatively short period (e.g., five minutes) rather than a relatively long period (e.g., four to five hours). The present invention includes hardware data compressor means 70 particularly shown in FIG. 9D.

The hardware data compressor means 70 monitors the serial stream of binary video data in eight-bit sets or groupings referred to hereinafter as "bytes." If any byte of information contains one or more bits indicating that a shiny portion of the chart 12 has been detected, this byte and the number of the byte in the serial stream of bytes is transferred to the microcomputer means 48 of the processor unit 6. The byte count is maintained by the byte counter means 174 described hereinabove. The count of the byte counter means 174 is incremented in response to the byte strobe signal generated by the eight-bit byte strobe means 38 shown particularly in FIG. 7A.

To control the transferal of the byte counts and the bytes containing bits signifying a light portion of the chart 12, the video data compressor means 70 includes the control means 178. When the ORG timing signal and the binary video signal both are at a logic "1" level in the preferred embodiment, the AND gate 192 clocks the first flip-flop 194 to maintain a logic "1" at the Q output thereof. At one end of the ORG pulse during which the first flip-flop 194 was switched to a high logic output, the second flip-flop 196 is triggered so that a low logic level signal is provided at the $\bar{Q}$ output thereof. This $\bar{Q}$ output provides a valid video byte control enabling signal which indicates that a valid video byte containing at least one bit representing a light portion of the chart 12 has been detected. This enables the AND gate 198 so that a subsequent control signal provided by the third flip-flop 200 generates a signal requesting a direct memory access of the microcomputer means 48 whereby the relevant byte of information and the corresponding byte count are transferred to the appropriate memory location of the microcomputer means 48.

The control signal provided by the third flip-flop 200 is generated in response to the combinational logic circuit responding to the chart valid signal and the byte strobe signal. Assuming that the chart valid signal is high thereby indicating that a valid chart is being read, when the byte strobe signal goes to a logic "1" level, the inputs of the NAND gate 202 are set to a logic low level and a logic high level so that the input to the set input of the third flip-flop 200 is maintained at a logic low level. However, when the byte strobe signal returns to a logic low level, the inputs of the NAND gate 202 are momentarily both at a high logic level which causes a pulse to be applied to the set input of the third flip-flop 200 thereby triggering the Q output of the third flip-flop 200 to a high logic level. This high logic level provides the control signal, in combination with the valid video byte control signal, to request the direct memory access of the microcomputer means 48.

These control signals of the video data compressor means 70 are provided in the aforementioned way so that the data at the outputs of the byte counter buffer means 186 and the video data shift register buffer means 190 have time to stabilize prior to transferal to the memory of the microcomputer means 48.

Through the operation of the data compressor means 70, the video information is compressed by a significant factor so that the information contained in the microcomputer means 48 comprises the areas of the chart 12 which have been detected to be light areas and also possibly some areas of dark surrounding these light areas. These dark areas will be included if the light areas are less than eight bits of information or are split between or among two or more consecutive bytes of information.

To further reduce the quantity of information to be transmitted to the central computer subsystem 8, the overall data compressor means of the preferred embodiment further includes a software compressor means comprising a portion of the software program of the microcomputer means 48. This portion of the program vectorizes the bits of information received from the video data compressor means 70 into groupings of straight line segments so that only the coordinates of the starting point of each segment and lengths of subsequent vectors from the starting point need be transferred to the central computer subsystem 8. This eliminates those bits of information which have been stored via the video data compressor means 70 and which lie between the vectorized end points. In the preferred embodiment each segment is contemplated to be no longer than 100 mils. These coordinates and lengths are represented by second binary bit electrical signals which have been derived or converted from those ones of the first binary signals from the reader unit 4 which have been passed to the microcomputer means 48 by the data compressor means 70.

Through the operation of the hardware and software compressor means of the present invention, the $4 \times 10^7$ bits of information to be read from the chart 12 are compressed or reduced to approximately $8 \times 10^4$ bits. In other words, the preferred embodiment compressor means achieves in its preferred embodiment use, data compression by a factor of approximately 500.

Once the video data has been compressed by the video data compressor means 70 and the software compressor of the microcomputer means 48, the microcomputer means 48 prompts the operator at the local station 2 via the display 54 to establish the phone link of the preferred embodiment transmission means 10 and to proceed with the transmission. To establish the phone link, the local operator dials the telephone number of the central computer subsystem 8. When the telephone is answered by the telephone answering means 74 of the central computer subsystem 8, a high frequency computer tone is generated to verify that a transmission connection has been made. The operator then places the receiver of the telephone securely into the acoustic coupler means 56 associated with the processor unit 6. Once this is accomplished, transmission continues under automatic control of the local station 2 and the central computer subsystem 8. During such a transmission formation data and tool data generated from the question and answer routine described hereinabove and the vectorized data from all the charts which have been placed into the output table of the processor unit 6 are transmitted to the central computer subsystem 8.

Once the automatic transmission has concluded, the operator at the local station 2 can convey special instructions and other information which must be verbally transmitted. The verbal transmissions are communicated over the same telephone link and are recorded by the tape recorders 76 contained within the call receiving section 72.

Upon the completion of the verbal comments, if any, the microcomputer means 48 indicates that a successsful transmission has occurred so that the operator at the local station 2 can operate the apparatus to power down if all of the charts have been read. If additional charts are to be read, the foregoing procedure is repeated.

Summarizing the operation of the reader unit 4 and the processor unit 6, these apparatus initially automatically determine the optical read threshold needed to locate and distinguish the shiny scribed lines of the graph 14 from the flat black background of the chart 12. The apparatus then divides the chart into one-inch strips along the time axis to accommodate the one-inch fields of view of the camera lens 112. To process each strip of the chart 12, the reader unit 4 reads each strip in one-half mil by one mil resolution as a sequence of bits by using the bright light 110, the camera lens 112 and the electronic photo-responsive element 124. The units 4 and 6 classify the bits as shiny or black, transfer the bits into a temporary memory table within the microcomputer means 48, combine neighboring shiny bits into lines and eliminate most spurious data such as scratches and smudges. The processor unit 6 classifies the lines as fine or coarse based on their density, locates the hydrostatic lines on each strip and eliminates all data outside these lines, compresses the data by a ratio of approximately 500 to 1 into a vectorized format, and stores these vectors in an output table for transmission via the transmission means 10. Once a single strip has been processed, the camera carriage is moved to the next strip and the operation loops back to process this strip. This process continues until all strips of the chart 12 have been processed.

Once the data have been received by the central computer subsystem 8, the central computer means located thereat controls the analysis of the data to prepare a final report containing information which will be utilized by the people in the field at the local station 2 to determine whether to continue the drilling operation or to terminate it.

At the central computer subsystem 8, the operator associated therewith takes the magnetic recording tapes from the call receiving means 72 and types into the central computer the verbal comments provided by the operator at the local station 2. This can be achieved via the VT-52 or VT-100 alphanumeric CRT's 94.

An engineer at the central computer subsystem 8 interfaces with the central computer by means of the graphics terminal means 90 connected to the central computer through the high speed interface means 82. By manipulating the graphics means 90, such as by the cursor 88, the engineer can effectively erase extraneous matter which was detected by the reader unit 4 but which is not pertinent to the pressure versus time graph scribed on the chart. For example, this extraneous matter might include scratches. In addition to erasing extraneous matter, the engineer can create a file of data points along the pressure curve.

Once the engineer has manipulated the data received from the local station 2, the resultant data file is analyzed by appropriate software in the central computer. In the preferred embodiment this analysis software performs various functions known in the art of downhole pressure logging.

At the conclusion of the analysis, the central computer prepares a finished report which is to be transmitted to the local station 2 so that the personnel located at the local station 2 can utilize the report to determine how to proceed. The finished report can be transmitted via mail, telecopy or other suitable means.

It is noted that the specific component values and numbers shown in the drawings are for the purpose of disclosing the specific preferred embodiment. These values and numbers are not to be taken as necessarily limiting the present invention to those specific values and numbers shown.

It is also noted that the present invention can be constructed to read, communicate and analyze indicia other than graphical data contained on media other than drill stem test charts.

Thus, the present invention is well adapted to carry out the objects and attain the ends and advantages mentioned above as well as those inherent therein. While the preferred embodiment of the invention has been described for the purposes of this disclosure, numerous changes in the construction and arrangement of the parts can be made by those skilled in the art, which changes are encompassed within the spirit of this invention as defined by the appended claims.

APPENDIX

High Speed Interface

This invention relates generally to a data transmission interface between a host computer and a graphics terminal and more particularly, but not by way of limitation, to a high-speed interface for coupling a Digital Equipment Corporation PDP-11 computer, having a Unibus data transferal system, with a Tektronix 4014 graphics terminal so that data can be transferred to the graphics terminal at speeds up to its input capability of approximately 307 kilobaud.

To display graphic information generated by means of a computer, the computer is often connected to a graphics display terminal having a screen which can be actuated electronically to display the graphic information. So that the elements of the graphics terminal are able to properly respond to the electrical signals provided by the computer as electrical representations of the graphic information, there is the need for an interface which makes the output of the computer compatible with the input of the graphics terminal.

An interface which is generally suitable can be relatively simple. For example, the interface could include electrical conductors containing line drivers for boosting the signals transferred between the output of the computer and the input of the graphics terminal. With this type of mechanism, however, the computer must perform any format conversions necessary to convert the normal computer output format into a format understandable by the graphics terminal. This can be undesirable because having such a format conversion function performed by the computer prevents the computer from doing other tasks which might be more desirable for it to perform. Additionally, the computer may operate at a slower rate than the graphics terminal is capable of so that if the computer is used to control the data transferal between itself and the graphics terminal, the system will operate inefficiently because time during which the graphics terminal could operate will be lost.

By way of a specific example, a Digital Equipment Corporation PDP-11 computer can be interfaced with a Tektronix 4014 graphics terminal by means of a Digital Equipment Corporation KL-11 serial interface device. This system is limited to data transferal rates of approximately 20–30 kilobaud for several reasons. For example, the KL-11 is an interrupt-per-character device, and the operating system requires substantial overhead to process each interrupt thereby slowing down the system. Additionally, the PDP-11 must convert the format of its normal output into a format understandable by the Tektronix 4014. This relatively simple system is inefficient because the Tektronix 4014 graphics terminal has a capability of receiving and processing information at rates up to approximately 307 kilobaud.

Therefore, there is the need for an interface device and a method which increase the transferal rate or throughput of data to a graphics terminal to enhance the utilization of the overall system. To provide the increased speed, it is desirable to have the interface device make the necessary format transformations. Specifically, it is desirable to have the interface device convert a pair of twelve-bit coordinates, such as are ordinarily provided by a PDP-11 computer, into five seven-bit bytes of information, such as are required by a Tektronix 4014 graphics terminal.

Because there are currently other types of interface devices, such as the KL-11, it is also desirable that a new interface device be capable of operating in a mode whereby it emulates a present device, such as the KL-11 serial interface.

In addition to having the foregoing attributes, such a new interface device should also have the capability of retransmitting information to the graphics terminal in the event the graphics terminal is capable of operating in what is known as a "write-through" mode. With a graphics terminal of the type exemplified by the Tektronix 4014 graphics terminal, data can be written through so that an image can be moved across the screen of the graphics terminal without retaining former images. When such a graphics terminal normally displays a stationary figure, an electron beam having a sufficiently high voltage impinges upon the screen of the graphics terminal and causes the screen to retain the image without having to continuously cycle the same data controlling the electron beam. However, if the voltage of the electron beam is not sufficiently high, once the beam passes a particular location, whatever image was displayed by the beam disappears. In this latter mode, referred to as the "write-through" mode, it is necessary to refresh the picture by continuously recycling the control data to recycle the electron beam.

The present invention provides a novel and improved interface device and method which meet the above-noted needs. In particular, the present invention provides an interface between a computer having a Unibus data transferal system, such as is found in a Digital Equipment Corporation PDP-11 computer, and a Tektronix 4014 graphics terminal. The interface of the present invention is capable of receiving data from the Unibus system, converting the data into a format usable by the Tektronix 4014 graphics terminal, and transferring the converted data to the Tektronix 4014 graphics terminal at rates of speed up to the operating speed of the Tektronix graphics terminal. The device of the present invention also is capable of operating in a mode wherein the device emulates a KL-11 serial interface. The present invention can also recycle the data transmitted to the graphics terminal to accommodate a graphics terminal which can be operated in a "write-through" mode.

Broadly, the apparatus of the present invention includes receiver means for receiving electrically coded information from a host computer. The apparatus also includes storage means for providing addressable locations where the electrically coded information received from the host computer can be stored. The present invention further includes control means which responds to predetermined ones of the electrically coded information by being placed in either a first mode of operation or a second mode of operation. In the first mode of operation the control means transfers the electrically coded information substantially directly to the graphics terminal in a manner similar to the operation of a KL-11 serial interface. In the second mode the control means transfers the electrically coded information to the storage means for subsequent high-speed transmission to the graphics terminal. In the second mode of operation the control means utilizes means for converting a pair of coordinates provided by the host computer into a group of five bytes of binary information usable by the graphics terminal. The control means also includes cycle means for retransmitting to the graphics terminal the information stored in the storage means when the graphics terminal is operated in a write-through mode.

Therefore, from the foregoing, it is a general object of the present invention to provide a novel and improved interface device and method. Other and further objects, features and advantages of the present invention will be readily apparent to those skilled in the art when the following description of the preferred embodiment is read in conjunction with the accompanying drawings.

What is claimed is:

1. An apparatus for rapidly analyzing graphic drill stem test data obtained from a well at a drilling site, comprising:

a drill stem test chart having a surface on which the graphic drill stem data are recorded;

optoelectronic means, located at the drilling site where the graphic drill stem test data are recorded, for automatically scanning said drill stem test chart and for automatically converting the graphic drill stem test data into electrical signals;

computer means, located at a site which is remote from said drilling site and at which is located at least one humane analyst, for receiving said electrical signals and for providing an output descriptive of the graphic drill stem test data, said computer means including graphic terminal means, responsive to said human analyst, for manipulating said computer means and said electrical signals;

electronic transmission means for enabling the substantially instantaneous communication of said electrical signals from said optoelectronic means to said computer means; and verbal communication means, associated with said computer means and to which said human analyst is responsive, for receiving and recording, from a person located at the drilling site, a verbal comunication passed through said electronic transmission means with the communication of said electrical signals from said optoelectronic means to said computer means.

2. An apparatus as defined in claim 1, wherein said optoelectronic means includes:

a reader unit, disposed in a first portable container at the drilling site outside of the well, for receiving said drill stem test chart after it has been taken from the well and for viewing said surface of said chart as an array of discrete informational units and for generating for each discrete informational unit a respective binary bit having one of two logic values depending upon whether the respective informational unit is relatively light or relatively dark; and a processor unit, disposed in a second portable container at the drilling site outside of the well and electrically connectible with said reader means, for controlling communications between said reader unit and said computer means.

3. An apparatus as defined in claim 2, wherein said processor unit includes:

hardware data compressor means, including:
    byte counter means for counting the number of sets containing a predetermined number of the binary bits generated by said reader unit;
    binary signal storage means for sequentially storing each binary bit within each of said sets; and
    control means for transferring the count of said byte counter means and said binary bits of said binary signal storage means when at least one of the stored bits has a first one of the two logic values; and software data compressor means for arranging the binary bits transferred by said control means into groupings and for designating said groupings as linear segments having a starting point and incremental lengths from the starting point, said groupings constituting at least a part of said electrical signals received by said computer means from said optoelectronic means over said electronic transmission means.

4. A system for preventing an extended cessation of drilling operations at a drilling site while awaiting an analysis of graphic data obtained during drilling operations at the site, said system comprising:

a local station, including:
- reader means for scanning the graphic data at the drilling site and for converting the graphic data into first binary signals, each of said first binary signals having a respective first or second logic value;
- data compressor means for passing primarily those of said first binary signals having the first logic value; and
- microcomputer means for receiving those of said first binary signals passed by said data compressor means and for converting said received first binary signals into second binary signals; and a central station, spaced from said local station, said central station including:
- call receiving means for receiving, within approximately five minutes after said first binary signals have been converted into said second binary signals, said second binary signals from said microcomputer means;
- graphic terminal means for manipulating the graphic data represented by said second binary signals received by said call receiving means;
- computer means, responsive to said call receiving means and said graphic terminal means, for analyzing said second binary signals as manipulated by said graphic terminal means and for generating a written report of the analysis; and
- means for transferring said written report to said local station.

5. A method of obtaining the expeditious analysis of data, initially occurring in visible graphic form, obtained from a well at a well site, comprising the steps of:
- optoelectronically converting, at the well site, the data from graphic form to corresponding electrical signals;
- substantially immediately electronically transmitting said electrical signals from the well site to a computer located remotely from the well site;
- transmitting along with said electrical signals a verbal communication conveying information related to said data;
- creating with said computer and in response to said verbal communication an output descriptive of the graphic data; and
- transmitting said output to the well site.

6. A method of rapidly analyzing a chart containing graphic data obtained from a well at a drilling site, comprising the
- entering into a microcomputer at the drilling site formation data about the formation in which the well is drilled;
- entering into said microcomputer tool string data about the tool string lowered into the well for obtaining the graphic data;
- mounting the chart on a rotatable drum of an optical scanner means for optoelectronically converting the graphic data into a plurality of first electrical signals representing binary bits of information, said optical scanner means including a photo-responsive means for converting light reflected from the chart on said drum into said first electrical signals;
- actuating said microcomputer to automatically control said optical scanner means and to receive said binary bits;
- compressing the number of said binary bits into a lesser number of second electrical signals representing substantially only the graphic portion of the chart;
- establishing a telephonic link with a central computer system spaced remotely from said microcomputer;
- transmitting over said telephonic link, under automatic control by said microcomputer and said central computer system, said formation data, said tool string data and said second electrical signals from said microcomputer to said central computer system;
- transmitting over said telephonic link verbal communications from said drilling site to said central computer system;
- transcribing said verbal communications into said central computer system;
- analyzing in said central computer system said formation data, said tool string data, said second electrical signals and said verbal communications and preparing a written report of the analysis; and
- transferring said written report to said drilling site.

7. A method as defined in claim 6, wherein said step of actuating said microcomputer to automatically control said optical scanner means includes:
- moving said photo-responsive means to one end of said drum;
- rotating said drum in one-mil increments until said drum has been fully rotated one time so that said photo-responsive means views a first quarter strip of the chart;
- moving said photo-responsive means to a second quarter strip of the chart adjacent said first quarter strip;
- rotating said drum in one-mil increments until said drum has been fully rotated one time so that said photo-responsive means views said second quarter strip of the chart;
- moving said photo-responsive means to a third quarter strip of the chart adjacent said second quarter strip;
- rotating said drum in one-mil increments until said drum has been fully rotated one time so that said photo-responsive means views said third quarter strip of the chart;
- moving said photo-responsive means to a fourth quarter strip of the chart adjacent said third quarter strip; and
- rotating said drum in one-mil increments until said drum has been fully rotated one time so that said photo-responsive means views said fourth quarter strip of the chart.

8. A method as defined in claim 6, wherein said step of compressing the number of binary bits reduces the number of said binary bits by a factor of approximately 500.

* * * * *